United States Patent
Sathe et al.

(10) Patent No.: US 12,422,943 B2
(45) Date of Patent: *Sep. 23, 2025

(54) SYSTEM FOR DETECTING AND CHARACTERIZING TOUCH INPUTS AT A HUMAN-COMPUTER INTERFACE

(71) Applicant: Cirque Corporation, Sandy, UT (US)

(72) Inventors: Ninad Sathe, Sunnyvale, CA (US); Ilya Daniel Rosenberg, Sunnyvale, CA (US); Kirsten Etzold, Sunnyvale, CA (US)

(73) Assignee: Cirque Corporation, Sandy, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/607,073

(22) Filed: Mar. 15, 2024

(65) Prior Publication Data

US 2024/0288962 A1 Aug. 29, 2024

Related U.S. Application Data

(63) Continuation-in-part of application No. 18/207,603, filed on Jun. 8, 2023, now Pat. No. 12,164,690.

(Continued)

(51) Int. Cl.
*G06F 3/01* (2006.01)
*G06F 3/041* (2006.01)
*G06F 3/044* (2006.01)

(52) U.S. Cl.
CPC ...... *G06F 3/04146* (2019.05); *G06F 3/04166* (2019.05); *G06F 3/0445* (2019.05); *G06F 3/0447* (2019.05); *G06F 2203/04105* (2013.01)

(58) Field of Classification Search
CPC ............ G06F 3/04146; G06F 3/04166; G06F 3/0445; G06F 3/0447; G06F 2203/04105;
(Continued)

(56) References Cited

U.S. PATENT DOCUMENTS 10,459,542 B1 * 10/2019 Costante ................ H05K 7/142
10,884,557 B2 * 1/2021 Yoon ..................... G06F 3/0447
(Continued)

OTHER PUBLICATIONS

International Search Report received in PCT/US24/20246 dated Jul. 2, 2024.

*Primary Examiner* — Ibrahim A Khan

(57) ABSTRACT

A system includes: a substrate; a first electrode proximal a center on the substrate; and a second electrode interposed between the first electrode and an edge on the substrate. The system also includes a first coupling region: arranged on a first planar region of the baseplate; offset from the first electrode by a first height; and coupling to the first electrode to yield a first electrical value at the first electrode responsive to application of a force magnitude proximal the center. The system further includes a second coupling region: arranged on a second planar region, offset above the first planar region, of the baseplate; offset from the second electrode by a second height, less than the first nominal gap height; and coupling to the second electrode to yield a second electrical value, approximating the first electrical value, at the second electrode responsive to application of the force magnitude.

20 Claims, 12 Drawing Sheets

Related U.S. Application Data

(60) Provisional application No. 63/452,327, filed on Jun. 8, 2022, provisional application No. 63/452,527, filed on Mar. 16, 2023.

(58) Field of Classification Search
CPC ...... G06F 1/1662; G06F 1/169; G06F 1/1692; G06F 3/016; G06F 3/03547; G06F 3/04144; G06F 3/0416; G06F 3/045; G06F 3/04886; G06F 1/1616
See application file for complete search history.

(56) References Cited

U.S. PATENT DOCUMENTS

| | | | |
|---|---|---|---|
| 11,127,547 B1* | 9/2021 | Wang | G06F 1/1684 |
| 2002/0149571 A1* | 10/2002 | Roberts | G06F 3/04142 |
| | | | 345/173 |
| 2016/0033342 A1* | 2/2016 | Lyon | G01L 1/142 |
| | | | 73/862.626 |
| 2016/0188039 A1* | 6/2016 | Yoon | G06F 3/0412 |
| | | | 345/174 |
| 2016/0188082 A1* | 6/2016 | Ham | G02F 1/13338 |
| | | | 345/173 |
| 2017/0052616 A1 | 2/2017 | Lin et al. | |
| 2017/0060329 A1* | 3/2017 | Yoon | G06F 3/0447 |
| 2018/0039351 A1* | 2/2018 | Zhu | G06F 3/0443 |
| 2018/0052548 A1* | 2/2018 | Katsuta | G02F 1/13338 |
| 2018/0238716 A1* | 8/2018 | Madden | G01L 1/146 |
| 2018/0307345 A1* | 10/2018 | Yairi | G06F 3/0418 |
| 2019/0004651 A1* | 1/2019 | Hong | G06F 3/0416 |
| 2020/0033971 A1* | 1/2020 | Lee | G06F 3/045 |
| 2020/0201484 A1* | 6/2020 | Lee | G06F 3/04144 |
| 2021/0278967 A1 | 9/2021 | Rosenberg et al. | |
| 2022/0334645 A1 | 10/2022 | Junus et al. | |

* cited by examiner

SYSTEM FOR DETECTING AND CHARACTERIZING TOUCH INPUTS AT A HUMAN-COMPUTER INTERFACE

CROSS-REFERENCE TO RELATED APPLICATIONS

This application is a continuation-in-part application of U.S. Non-Provisional application Ser. No. 18/207,603, filed on 8 Jun. 2023, which claims the benefit of U.S. Provisional Application No. 63/350,327, filed on 8 Jun. 2022, each of which is hereby incorporated in its entirety by this reference.

This application claims the benefit of U.S. Provisional Application No. 63/452,527, filed on 16 Mar. 2022, which is hereby incorporated in its entirety by this reference.

This application is related to U.S. Non-Provisional application Ser. No. 18/204,818, filed on 1 Jun. 2023, Ser. No. 17/669,209, filed on 10 Feb. 2022, and Ser. No. 17/191,636, filed on 3 Mar. 2021, each of which is hereby incorporated in its entirety by this reference.

TECHNICAL FIELD

This invention relates generally to the field of touch sensors and more specifically to a new and useful human-computer interface system in the field of touch sensors.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System: Electrode Area

Figure 1:
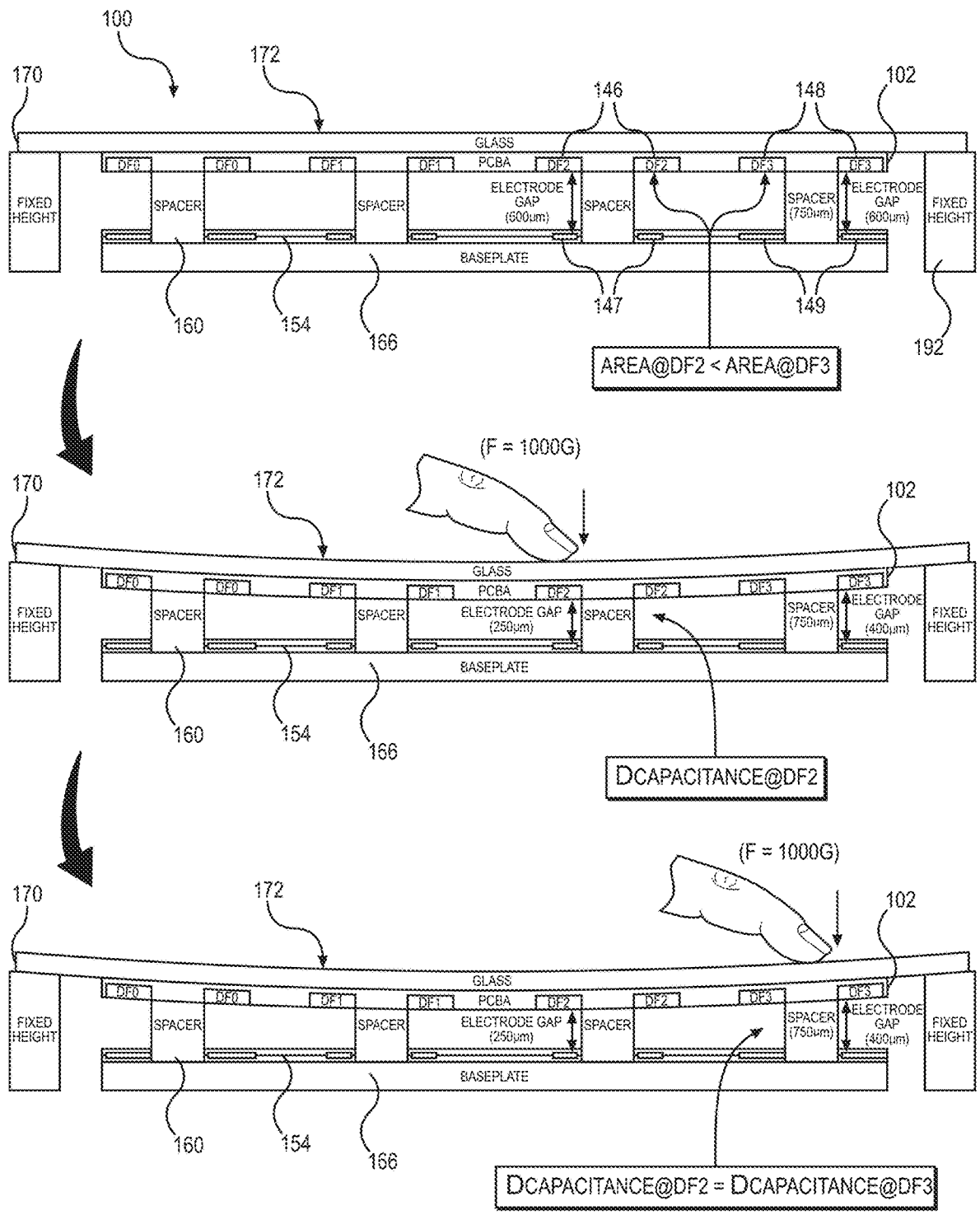
FIG. 1 is a schematic representation of the system.

As shown in FIG. 1, a system 100 for detecting force inputs includes: a substrate 102; a first electrode 146; a second electrode 148; a baseplate 166; a set of spacer elements 160; a first coupling region 147; and a second coupling region 149.

The substrate 102 includes a first edge supported by a chassis 192.

The first electrode 146 spans a first area on the substrate 102 and is arranged proximal a center of the substrate 102. Additionally, the second electrode 148 spans a second area, greater than the first area, on the substrate 102 and is interposed between the first electrode 146 and the first edge of the substrate 102.

The baseplate 166 is arranged under the substrate 102. The set of spacer elements 160: is interposed between the substrate 102 and the baseplate 166; and is configured to support the substrate 102 over the baseplate 166.

The first coupling region 147: is arranged on the baseplate 166; faces the first electrode 146; and electrically couples to the first electrode 146 to yield a first change in electrical values at the first electrode 146 responsive to application of a first force magnitude proximal the center of the substrate 102.

The second coupling region 149: is arranged on the baseplate 166; faces the second electrode 148; and electrically couples to the second electrode 148 to yield a second change in electrical values—approximating the first change in electrical values—at the second electrode 148 responsive to application of a second force magnitude, approximating the first force magnitude, proximal the first edge of the substrate 102.

1.1 Variation: Electrode Gap

Figure 2:
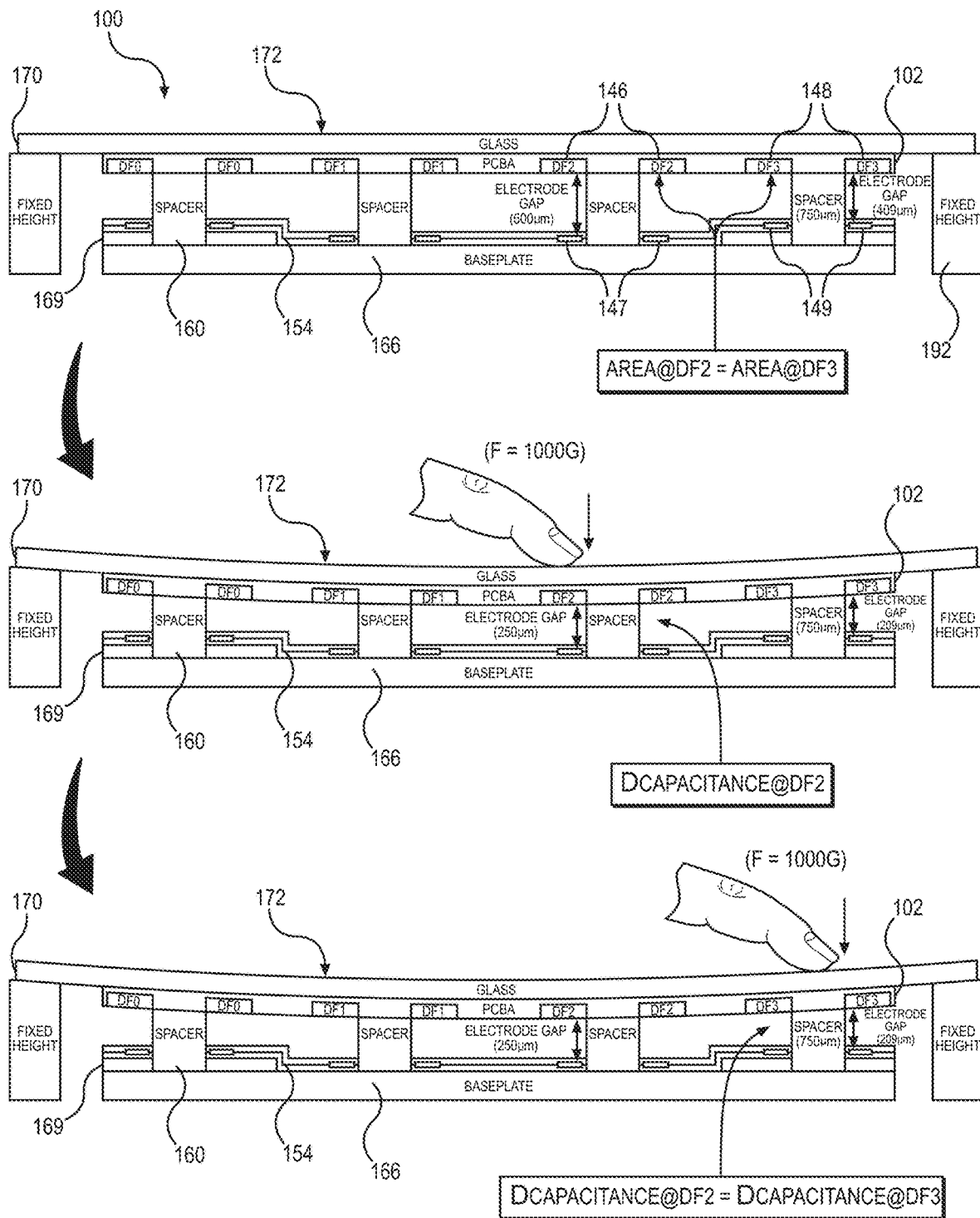
FIG. 2 is a schematic representation of the system.

As shown in FIG. 2, the system 100 for detecting force inputs includes: a substrate 102; a first electrode 146; a second electrode 148; a baseplate 166; a set of spacer elements 160; a first coupling region 147; and a second coupling region 149.

The substrate 102 includes a first edge supported by a chassis 192.

The first electrode 146 is arranged on the substrate 102 proximal a center of the substrate 102. The second electrode 148 is arranged on the substrate 102 and interposed between the first electrode 146 and the first edge of the substrate 102.

The baseplate 166 is arranged below the substrate 102 and includes: a first planar region below the first electrode 146 on the substrate 102; and a second planar region, offset above the first planar region, below the second electrode 148 on the substrate 102. The set of spacer elements 160: is interposed between the substrate 102 and the baseplate 166; and is configured to support the substrate 102 over the baseplate 166.

The first coupling region 147: is arranged on the first planar region of the baseplate 166; is aligned to the first electrode 146; is offset from the first electrode 146 by a first nominal gap height; and electrically couples to the first electrode 146 to yield a first change in electrical values at the first electrode 146 responsive to application of a first force magnitude proximal the center of the substrate 102.

The second coupling region 149: is arranged on the second planar region of the baseplate 166; is aligned to the second electrode 148; is offset from the second electrode 148 by a second nominal gap height, less than the first nominal gap height; and electrically couples to the second electrode 148 to yield a second change in electrical values, approximating the first change in electrical values, at the second electrode 148 responsive to application of a second force magnitude, approximating the first force magnitude, proximal the first edge of the substrate 102.

2. Applications

Generally, the system 100 defines a force sensor for a human-computer interface that includes a first capacitive force sensor: defining a first sensor configuration (e.g., electrode area configuration, electrode gap configuration); arranged proximal a center of a touch sensor surface 172 (e.g., trackpad, a keyboard, a touch-sensitive display) of the system 100; and configured to yield a first change in capacitance values (e.g., two picofarads) responsive to application of a first force magnitude (e.g., 1000 grams) proximal the center of the touch sensor surface 172. Additionally, the system 100 includes a second capacitive force sensor: defining a second sensor configuration (e.g., electrode area configuration, electrode gap configuration) different from the first sensor configuration; arranged proximal an edge of the touch sensor surface 172; and configured to yield a second change in capacitance values (e.g., two picofarads)—approximating (e.g., +/−0.02 picofarads) the first change in capacitance values—responsive to application of a second force magnitude (e.g., 1000 grams), approximating (e.g., +/−5 grams) the first force magnitude, responsive to application of the second force magnitude proximal the edge of the touch sensor surface 172.

Thus, the system 100 can, rather than yield non-uniform change in electrical values (e.g., capacitance values) across the first force sensor and the second force sensor responsive to application of a target force magnitude (e.g., 1000 grams) over the substrate 102, the system 100 can: responsive to application of the target force magnitude (e.g., 1000 grams), yield uniform change in electrical values across the first force sensor and the second force sensor; and interpret force magnitudes over the substrate 102 based on deviations—per unit force—from the uniform change in electrical values across the first force sensor and the second force sensor.

2.1 Applications: Electrode Area Configuration

In one example shown in FIG. 1, the system 100 includes: a first sense electrode spanning a first area (e.g., 55 millimeters squared) on a bottom layer 140 of a substrate 102 proximal the center of the substrate 102; and a second sense electrode spanning a second area (e.g., 90 millimeters)—greater than that the first area—on the bottom layer 140 of the substrate 102 proximal the edge of the substrate 102. The system 100 further includes: a baseplate 166 arranged below the substrate 102; a coupling layer 154 arranged over the baseplate 166 and including a first coupling region 147 and a second coupling region 149. In this example, the substrate 102 defines: a high-deflection region (i.e., the center region of the substrate 102 experiencing high-deflection toward the baseplate 166 responsive to forces applied to the touch sensor surface 172); and a low-deflection region adjacent the high-deflection region (i.e., a side region proximal a lateral edge of the substrate 102 experiencing low-deflection toward the baseplate 166 responsive to forces applied to the touch sensor surface 172).

The system 100 includes the first coupling region 147 (e.g., drive electrodes) capacitively coupling the first sense electrode to form the first capacitive force sensor characterized by the first baseline capacitance value derived from a capacitance relationship between: a nominal gap (e.g., 600 micrometers) between the first capacitive force sensor; and the first area. Additionally, the system 100 includes the second coupling region 149 (e.g., drive electrode) capacitively coupling the second sense electrode to form the second capacitive force sensor characterized by a second baseline capacitance value—greater than the first capacitance value—derived from a capacitance relationship between: the nominal gap (e.g., 600 micrometers) between the second capacitive force sensor; and the second area.

Thus, during application of a target force input (e.g., 1000 grams) on the touch sensor surface 172: the high-deflection region of the substrate 102 displaces (e.g., 350 micrometers) toward the coupling layer 154 to induce a first change in capacitance at the first capacitive force sensor from the first baseline capacitance value; and the low-deflection region of the substrate 102 displaces (e.g., 200 micrometers) toward the coupling layer 154 to induce a second change in capacitance—approximating the first change in capacitance (e.g., +/−0.02 picofarads)—at the second capacitive force sensor.

Accordingly, the system 100 can then: detect a touch input over the touch sensor surface 172, such as based on touch data captured from drive and sense electrode pairs arranged across the top layer 104 of the substrate 102; read a first set of electrical values from the first capacitive force sensor under the high-deflection region; and read a second set of electrical values from the second capacitive force sensor under the low-deflection region. The system 100 can then: detect the a first change in capacitance across the first capacitive force sensor based on the first set of electrical values and the first baseline capacitance value; detect a second change in capacitance—approximating the first change in capacitance (e.g., +/−0.02 picofarads) across the second capacitive force sensor based on the second set of electrical values and the second baseline capacitance value; and interpret the target force magnitude (e.g., 1000 grams) for the touch input applied over the touch sensor surface 172 based on the first capacitance and the second capacitance.

Therefore, electrode areas in the first capacitive force sensor and the second capacitive force sensor can be configured in order to output uniform change in electrical values (e.g., capacitance values) responsive to application of a target force magnitude (e.g., 1000 grams) resulting in uneven deflection of the substrate 102 toward the baseplate 166.

2.1 Applications: Electrode Gap Configuration

In one example shown in FIG. 2, the system 100 includes: a first sense electrode spanning a target area (e.g., 55 millimeters) on the bottom layer 140 of the substrate 102 at the high deflection region and offset by a first nominal gap (e.g., 600 micrometers) from the coupling layer 154; and a second sense electrode spanning the target area (e.g., 55 millimeters) on the bottom layer 140 of the substrate 102 at the low-deflection region and offset by a second nominal gap (e.g., 400 micrometers) from the coupling layer 154. In this example, the first coupling region 147 (e.g., drive electrode) capacitively couples to the first sense electrode to form a first capacitive force sensor characterized by a first baseline capacitance value derived from a capacitance relationship between the first nominal gap and the target area. Additionally, the second coupling region 149 (e.g., drive electrode) capacitively couples to the second sense electrode to form a second capacitive force sensor characterized by a second baseline capacitance value—greater than the first capacitance value—derived from a capacitance relationship between the second nominal gap and the target area. Thus, during application of a target force magnitude (e.g., 1000 grams) on the touch sensor surface 172, the high-deflection region and the low-deflection region of the substrate 102 uniformly displace toward the coupling layer 154 to induce uniform changes in capacitance (e.g., +/−0.02 picofarads) across the first capacitive force sensor and the second capacitive force sensor.

Accordingly, the controller 190 can then: detect a touch input over the touch sensor surface 172, such as based on touch data captured from drive and sense electrode pairs arranged across the top layer 104 of the substrate 102; read a first set of electrical values from the first capacitive force sensor under the high-deflection region; and read a second set of electrical values from the second capacitive force sensor under the low-deflection region. The controller 190 can then: detect a first capacitance (e.g., 2 picofarads) across the first capacitive force sensor based on the first set of electrical values and the first baseline capacitance value; detect a second capacitance—approximating the first capacitance (e.g., +/−0.02 picofarads) across the second capacitive force sensor based on the second set of electrical values and the second baseline capacitance value; and interpret the target force magnitude (e.g., 1000 grams) for the touch input applied over the touch sensor surface 172 based on the first capacitance and the second capacitance.

Therefore, electrode gap heights in the first force sensor and the second force sensor can be configured in order to output uniform changes in electrical values (e.g., capacitance values) responsive to application of the target force magnitude (e.g., 1000 grams) resulting in un-even deflection of the substrate 102 toward the coupling layer 154.

3. Substrate

Figure 10:
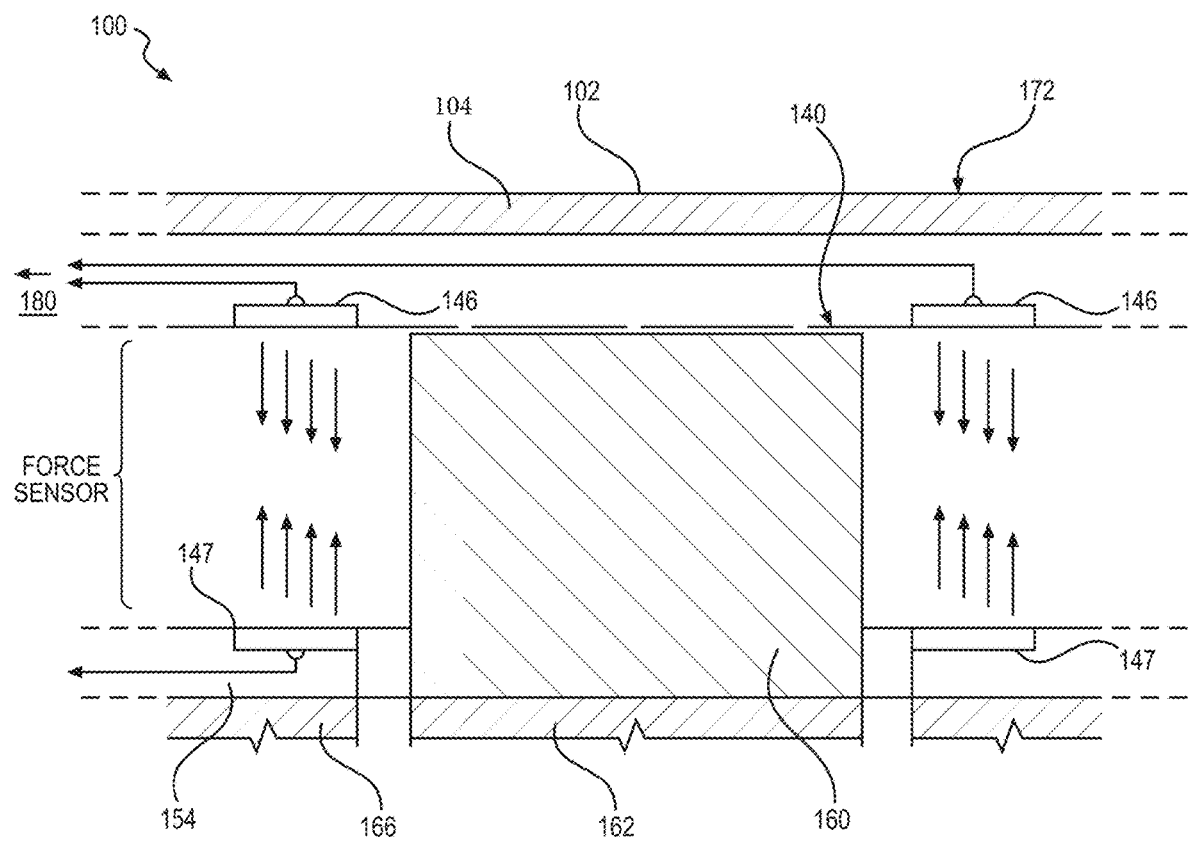
FIG. 10 is a schematic representation of the system.

As described above and shown in FIG. 10, the substrate 102 can include: a top layer 104; and a bottom layer 140 that defines a set of support locations. The substrate 102 further includes an electrode (e.g., sense electrode), in a set of electrodes, arranged across the bottom layer 140 and adjacent (e.g., encircling, abutting) the support locations. The set of electrodes (e.g., sense electrodes) can be printed directed across the bottom layer 140 of the substrate 102 and/or can be integrated into a rigid or flexible PCB layered over the bottom layer 140 of the substrate 102.

3.1 Sense Electrodes

In one implementation, the system 100 includes: each support location, in the set of support locations, arranged about a perimeter of the bottom layer 140 of the substrate 102; and the set of electrodes (e.g., sense electrodes) arranged across the bottom layer 140 adjacent the support locations.

For example, the system 100 can include: a first set of support locations arranged proximal corner edges of the bottom layer 140 of the substrate 102; and a second set of support locations arranged proximal lateral side edges of the bottom layer 140 of the substrate 102 between the corner edges. In this example, each sense electrode, in the set of electrodes (e.g., sense electrodes): can be arranged adjacent a first side of a support location, in the set of support locations; and define a shape encircling the support location—such as a semi-circular shape (e.g., horseshoe shape, crescent shape) encircling the support location, and/or a crenellation shape encircling the support location—on the first side of the support locations.

Additionally or alternatively in this example, sense electrodes in the set of electrodes (e.g., sense electrodes) can be arranged: proximal the lateral side edges of the bottom layer 140 of the substrate 102 abutting to the set of support locations about the perimeter of the bottom layer 140 of the substrate 102; and/or proximal a center of the bottom layer 140 of the substrate 102 abutting to support locations about the center of the bottom layer 140 of the substrate 102. In particular, sense electrodes can extend partially about a first lateral side edge of the bottom layer 140 of the substrate 102, and/or arranged proximal about a corner edge of the bottom layer 140 of the substrate 102 abutting to the set of support locations about the perimeter of the bottom layer 140 of the substrate 102. The system 100 can therefore: accommodate sense electrodes of varying shapes and sizes on the bottom layer 140 of the substrate 102 to maintain uniformity across the substrate 102; and reduce sensitivity to noise during scan cycles—by the controller 190—to read capacitance values from the set of electrodes (e.g., sense electrodes) on the bottom layer 140 of the substrate 102.

3.2 Mutual Capacitance Force Sensors

In one implementation shown in FIG. 1, the set of capacitance force sensors—formed by the set of coupling regions (e.g., drive electrodes) of the baseplate 166 and the set of electrodes (e.g., sense electrodes) of the substrate 102—are arranged in a mutual-capacitance configuration adjacent each support location.

For example, each capacitance force sensor can include: a sense electrode arranged on the bottom layer 140 of the substrate 102 adjacent a first side of a support location; and a drive electrode (e.g., conductive trace) fabricated on the coupling layer 154 of the baseplate 166 opposite the first side of the support location and in vertical alignment to the electrode (e.g., sense electrode). In this example, the set of electrodes (e.g., sense electrodes) and the set of coupling regions (e.g., drive electrodes) within the set of capacitance force sensors can capacitively couple each other, and an airgap between the substrate 102 and the baseplate 166 can form an air dielectric between the set of electrodes (e.g., sense electrodes) and the set of coupling regions (e.g., drive electrodes).

In the foregoing example, in response to a force input on the touch sensor surface 172, the adjacent spring elements can then yield such that the set of electrodes (e.g., sense electrodes) of the substrate 102 move closer to the set of coupling regions (e.g., drive electrodes) on the baseplate 166, thereby reducing the air gap between the set of electrodes (e.g., sense electrodes) and the set of coupling regions (e.g., drive electrodes). The reduced distance between the substrate 102 and the baseplate 166 thus increases the effective dielectric between the set of electrodes (e.g., sense electrodes) and set of coupling regions (e.g., drive electrodes) thus increasing the capacitance of the set of electrodes (e.g., sense electrodes) and the set of coupling regions (e.g., drive electrodes). The capacitance value of the capacitance force sensor may therefore deviate from a baseline capacitance value—such as in the form of an increase in the charge time of the capacitance force sensor and an increase in the discharge time of the capacitance force sensor, or a decrease in the resonant frequency of the capacitance force sensor—when the touch sensor surface 172 is depressed over the capacitance force sensor.

Therefore, in this implementation, the controller 190 can, during a scan cycle: (serially) drive each drive electrode in the set of coupling regions (e.g., drive electrodes), such as by a target voltage, over a target time interval, or with an alternating voltage of a particular frequency; read a set of capacitance values—from each sense electrode in the set of electrodes (e.g., sense electrodes)—that represent measures of mutual capacitances between the set of electrodes (e.g., sense electrodes) and the set of coupling regions (e.g., drive electrodes) of the set of capacitance force sensors; and interpret a distribution of forces applied to the touch sensor surface 172 based on this set of capacitance values.

3.3 Self-Capacitance Force Sensors

In one implementation, the set of capacitance force sensors—formed by the set of coupling regions (e.g., drive electrodes) of the baseplate 166 and the set of electrodes (e.g., sense electrodes) of the substrate 102—are arranged in a self-capacitance configuration adjacent each support location.

For example, each capacitance force sensor can include a single electrode arranged on bottom layer 140 of the substrate 102 (e.g., encircling) a support location, and the baseplate 166 can be grounded to function as a common second electrode 148 for each capacitance sensor. In this example, the single electrode within a capacitance sensor and the baseplate 166 can capacitively couple, and an air gap between the substrate 102 and the baseplate 166 can form an air dielectric between the capacitance force sensor and the baseplate 166. Therefore, in this implementation, the controller 190 can, during a scan cycle, drive the baseplate 166 to a reference (e.g., ground) potential; (serially) drive each capacitance sensor, such as by a target voltage, over a target time interval, or with an alternating voltage of a particular frequency; read a set of capacitance values—from each sense electrode in the set of electrodes (e.g., sense electrodes)—that represent measures of self capacitances between the capacitance force sensors and the baseplate 166; and interpret a distribution of forces applied to the touch sensor surface 172 based on this set of capacitance values and known spring constants in the set of spring elements 162. In another implementation, the system 100 can implement a combination of mutual capacitance force sensors and self-capacitance force sensors to interpret force applied to the touch sensor surface 172. In this implementation, the controller 190 can sequentially execute scan cycles to read mutual capacitance values and self-capacitance values from the electrodes on the substrate 102 and the baseplate 166.

3.4 Capacitance Touch Sensor

Figure 13:
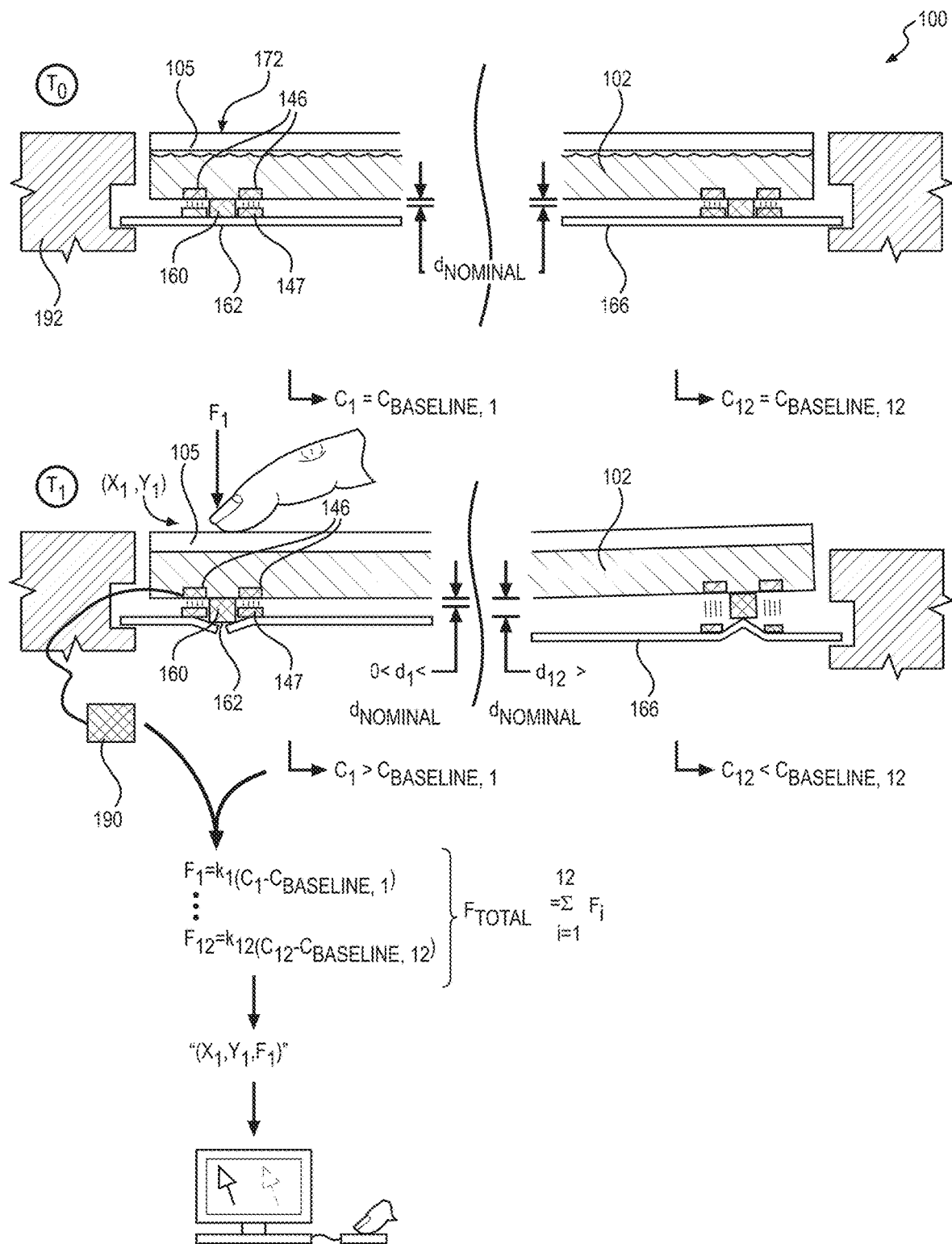
FIG. 13 is a schematic representation of the system.

As described above and shown in FIG. 13, the system 100 can further include a capacitance touch sensor arranged across the top layer 104 of the substrate 102. In one implementation, the capacitance touch sensor includes: a set of drive electrodes and sense electrodes arranged on the top layer 104 of the substrate 102; and a cover layer 170 (e.g., a glass film) arranged over the substrate 102 to enclose the set of drive electrodes and sense electrodes and to form the touch sensor surface 172 (e.g., a "tactile surface") over the substrate 102. In this implementation, the system 100 can include: a first quantity of capacitance force sensors that form a first quantity of pressure sensors between the substrate 102 and the baseplate 166; and a second quantity of drive electrodes and sense electrodes that form a second quantity of pixels—at least two orders of magnitude greater than the first quantity—in the capacitance touch sensor.

4. Baseplate

Generally, the baseplate 166: couples to the substrate 102 (e.g., via spacer elements); and is configured to effect capacitance values of the set of capacitance force sensors—formed by the set of electrodes on the bottom layer 140 of the substrate 102 and the set of coupling regions on the coupling layer 154—responsive to displacement of the substrate 102 toward the baseplate 166.

4.1 Coupling Layer

Figure 4:
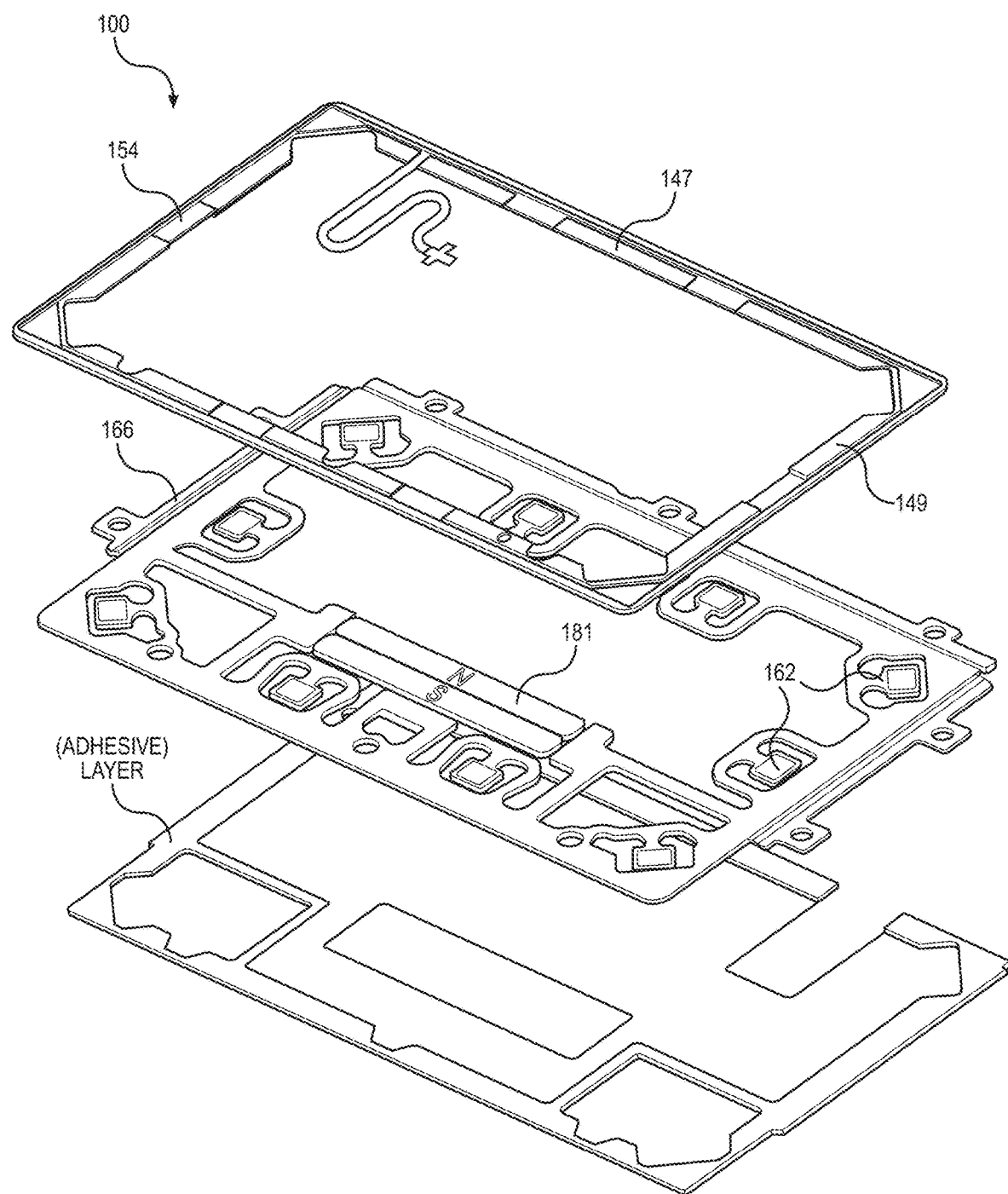
FIG. 4 is a schematic representation of the system.
Figure 5:
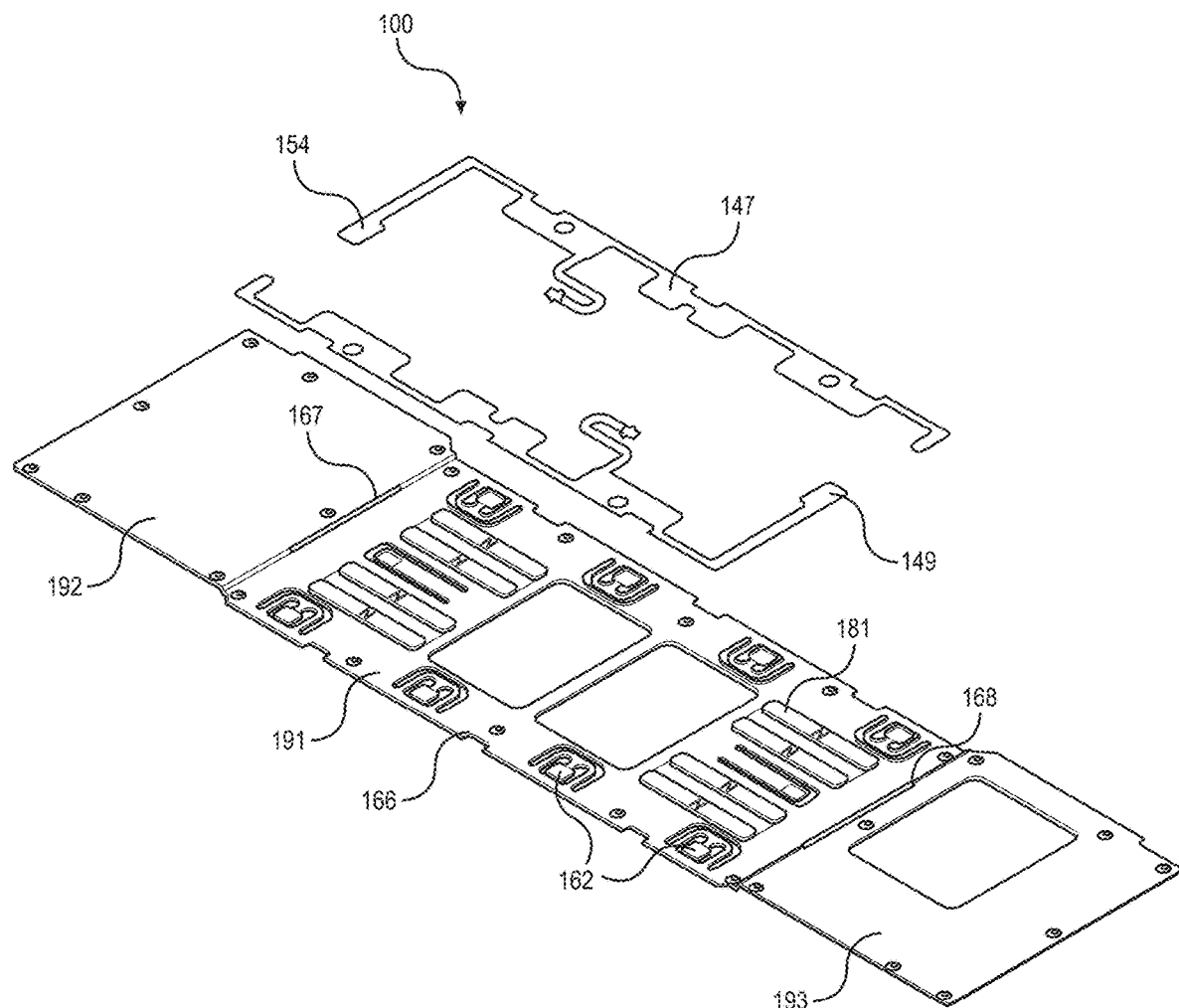
FIG. 5 is a schematic representation of the system.

In one implementation, as shown in FIGS. 4 and 5, the system 100 includes a baseplate 166 that includes: a unitary structure that spans the bottom layer 140 of the substrate 102; a coupling layer 154 (e.g., flex substrate 102) arranged across a top side-facing the bottom layer 140 of the substrate 102—of the baseplate 166; and the set of coupling regions (e.g., drive electrodes) arranged on the coupling layer 154 vertically aligned to the set of electrodes (e.g., sense electrodes) on the bottom layer 140 of the substrate 102. In one example, the set of coupling regions (e.g., drive electrodes) includes a conductive trace—such as formed from conductive ink (e.g., Ag, C, Cu, etc.), conductive polymers (e.g., PEDOT: PSS), patternable conductive material (e.g., graphene, ITO, metal mesh), and/or rolled annealed metal—across the coupling layer 154 of the baseplate 166 aligned with the set of electrodes (e.g., sense electrodes) on the bottom layer 140 of the substrate 102. In this example, the set of coupling regions (e.g., drive electrodes) can be printed directly across the coupling layer 154 of the baseplate 166 and/or can be integrated into a rigid or flexible PCB layered over the coupling layer 154 of the baseplate 166. Thus, in this example, each drive electrode can define a segment of the conductive trace—such as a continuous trace across the baseplate 166—configured to align with the set of electrodes (e.g., sense electrodes) across the bottom layer 140 of the substrate 102 in order to define the set of capacitance sensors.

Therefore, the system 100 can: drive the set of coupling regions (e.g., drive electrodes)—such as by a target voltage (e.g., 6 volts), over a target time interval, and/or with an alternating voltage at a particular frequency—across the coupling layer 154 of the baseplate 166; and read a set of capacitance values—from the set of electrodes (e.g., sense electrodes) across the bottom layer 140 of the substrate 102 aligned with the set of coupling regions (e.g., drive electrodes)—that represent measures of mutual capacitance in the set of capacitance force electrodes. As a result, the system 100 can increase the signal-to-noise ratio—such as by implementing drive voltages less than 6 volts—from the capacitance values read from the capacitance force sensors to interpret accurate magnitudes of force inputs applied to the touch sensor surface 172. In another implementation, the system 100 can include: a first coupling region 147 (e.g., drive electrode) arranged across a first region of the coupling layer 154 of the baseplate 166 and aligned with a first electrode 146 (e.g., sense electrodes) arranged across the bottom layer 140 of the substrate 102; and a second coupling region 149 (e.g., drive electrode) arranged across a second region of the coupling layer 154 of the baseplate 166 and aligned with a second electrode 148 (e.g., sense electrode) arranged across the bottom layer 140 of the substrate 102.

In one variation of this implementation, the first coupling region 147 (e.g., drive electrode) and the second coupling region 149 (e.g., drive electrode) can be connected by a single drive across the coupling layer 154 of the baseplate 166. Additionally, the first electrode 146 (e.g., sense electrodes) and the second electrode 148 (e.g., sense electrode) are individually connected to a sense line across the bottom layer 140 of the substrate 102. In another variation, the first coupling region 147 (e.g., drive electrode) and the second coupling region 149 (e.g., drive electrode) are connected in pairs of drive lines across the top layer 104 of the substrate 102. Additionally, the first electrode 146 (e.g., sense electrodes) can be connected by a first sense line and the second electrode 148 (e.g., sense electrode) can be connected by a second sense line across the bottom layer 140 of the substrate 102. Therefore, system 100 can selectively drive electrode pairs spanning particular regions of the touch sensor surface 172 and selectively read capacitance values from sense electrodes panning these particular regions of the touch sensor surface 172 to interpret inputs and force magnitudes over these particular regions.

For example, the first coupling region 147 (e.g., drive electrode) includes a first conductive trace: spanning the first region on the coupling layer 154 of the baseplate 166; and defining first segments in alignment with the first electrode 146 (e.g., sense electrodes) across the bottom layer 140 of the substrate 102. Furthermore, in this example, the second coupling region 149 (e.g., drive electrode) includes a second conductive trace: spanning the second region on the coupling layer 154 of the baseplate 166; and defining second segments in alignment with the second electrode 148 (e.g., sense electrode) arranged across the bottom layer 140 of the substrate 102. Therefore, the system 100 can, in response to detecting a touch input on the touch sensor surface 172 at the first region: drive the first coupling region 147 (e.g., drive electrode)—such as by a target voltage (e.g., 6 volts), over a target time interval, and/or with an alternating voltage at a particular frequency—across the coupling layer 154 of the baseplate 166; and read a set of capacitance values—from the first electrode 146 (e.g., sense electrodes) arranged across the bottom layer 140 of the substrate 102 and aligned with the first coupling region 147 (e.g., drive electrode)—that represent measures of mutual capacitance in the set of capacitance force electrodes in the first region. As a result, the system 100 can selectively interpret magnitudes of force inputs applied across regions of the touch sensor surface 172 to increase accuracy of the capacitance values read from the set of electrodes (e.g., sense electrodes) while conserving power during scan cycles of the system 100.

4.1.1 Variation: Substrate+Coupling layer

One variation of the system 100 includes a substrate 102 including: a set of coupling regions (e.g., drive electrodes) arranged (e.g., conductively traced) on a bottom layer 140 of the substrate 102; a set of support locations arranged on the bottom layer 140 adjacent the set of coupling regions (e.g., drive electrodes); and a touch sensor surface 172 arranged over a top layer 104 of the substrate 102. Additionally, the system 100 includes a baseplate 166: arranged below the substrate 102; including first electrode 146 (e.g., sense electrode) arranged on a coupling layer 154 of the baseplate 166 in alignment with the set of coupling regions (e.g., drive electrodes)—on the bottom layer 140 of the substrate 102—to form a set of capacitance force sensors; and configured to effect capacitance values of the set of capacitance force sensors responsive to displacement of the substrate 102 toward the baseplate 166. Furthermore, this variation of the system 100 includes a set of spring elements 162 configured to couple the substrate 102 to the baseplate 166 and to yield to displacement of the substrate 102 downward toward the baseplate 166 responsive to forces applied to the touch sensor surface 172, each spring element in the set of spring elements 162 coupled to the substrate 102 at a support location in the set of support locations.

This variation of the system 100 further includes a controller 190 configured to, during a scan cycle: read capacitance values from the set of electrodes (e.g., sense electrodes) across the coupling layer 154 of the baseplate 166; and interpret force magnitudes of inputs applied to the touch sensor surface 172 based on capacitance values read from the set sense electrodes.

4.2 Spring Elements

Figure 11A:
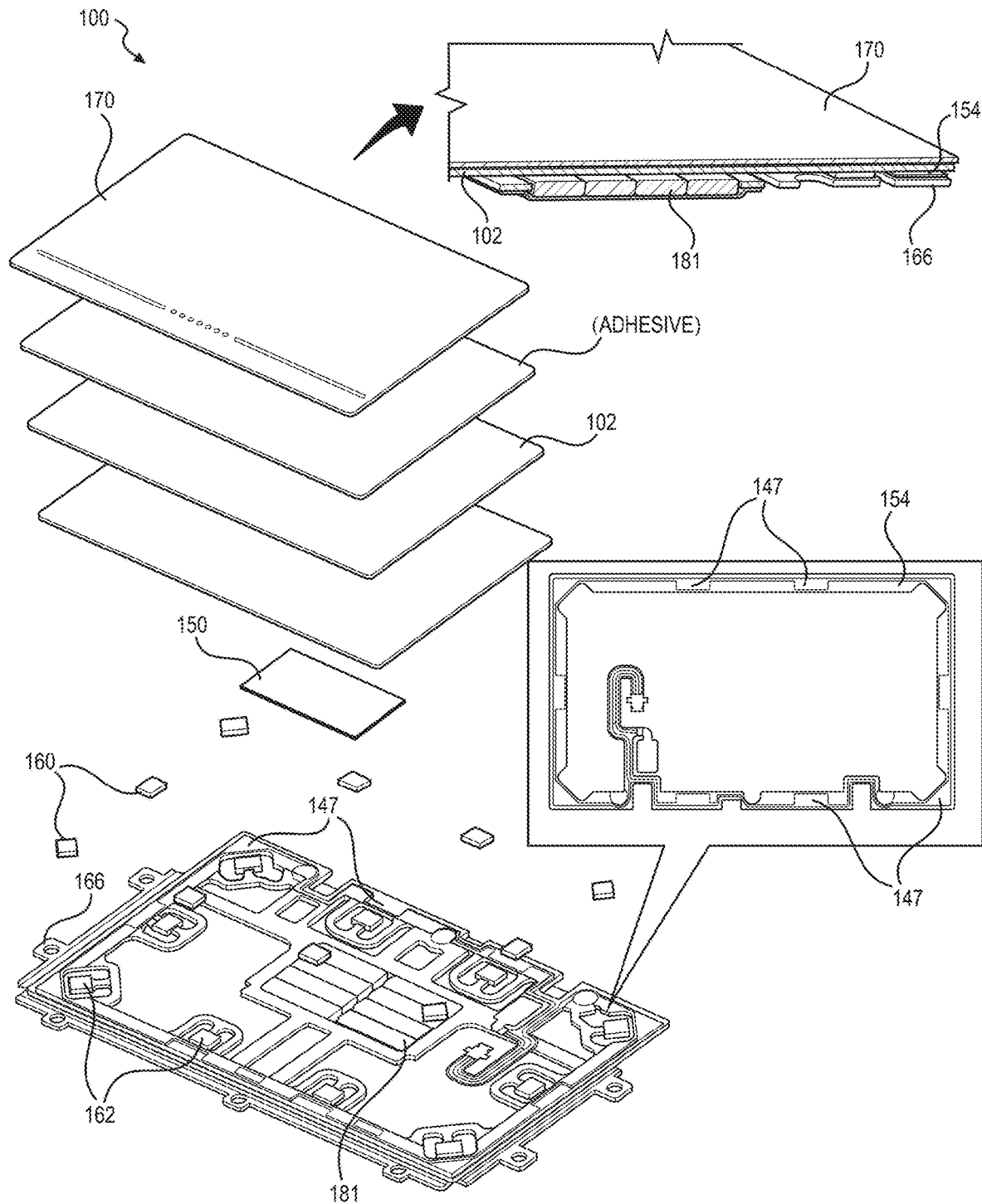
FIGS. 11A and 11B are schematic representations of the system.
Figure 11B:
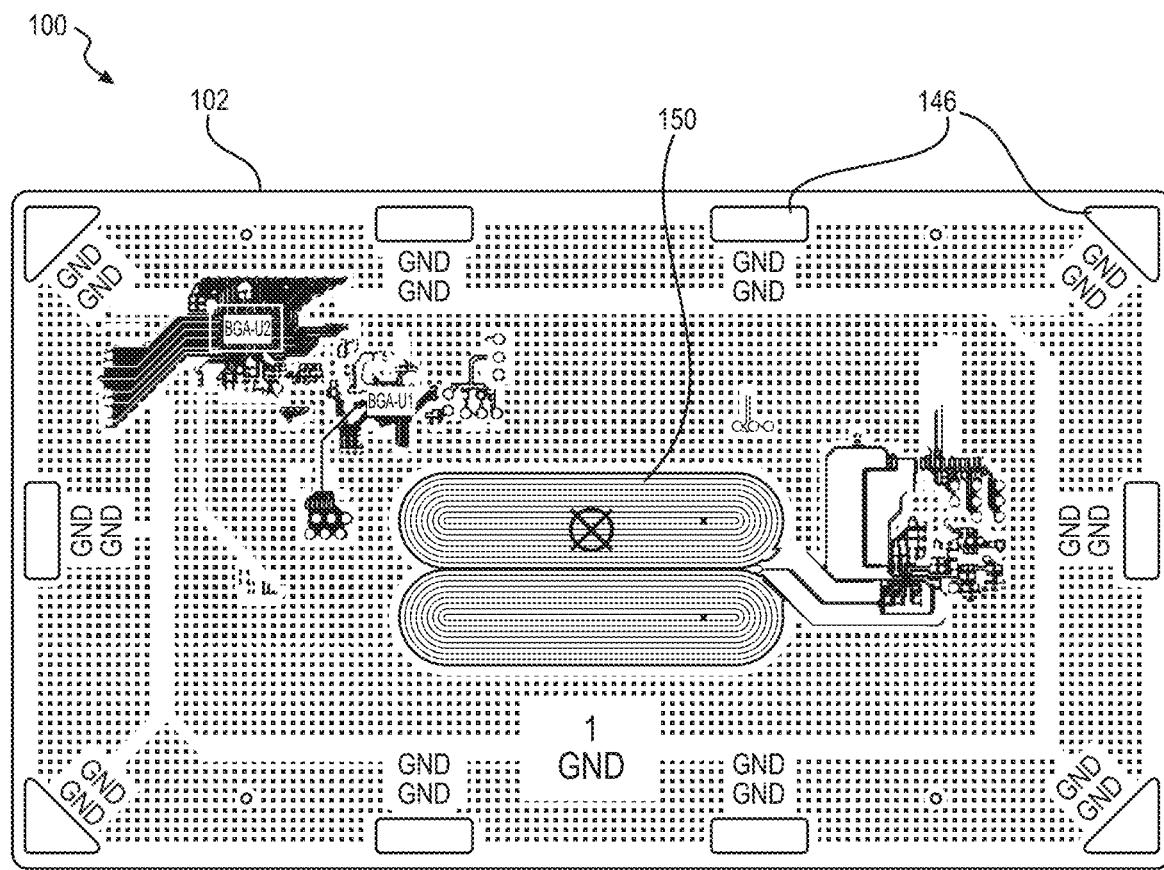
Figure 12A:
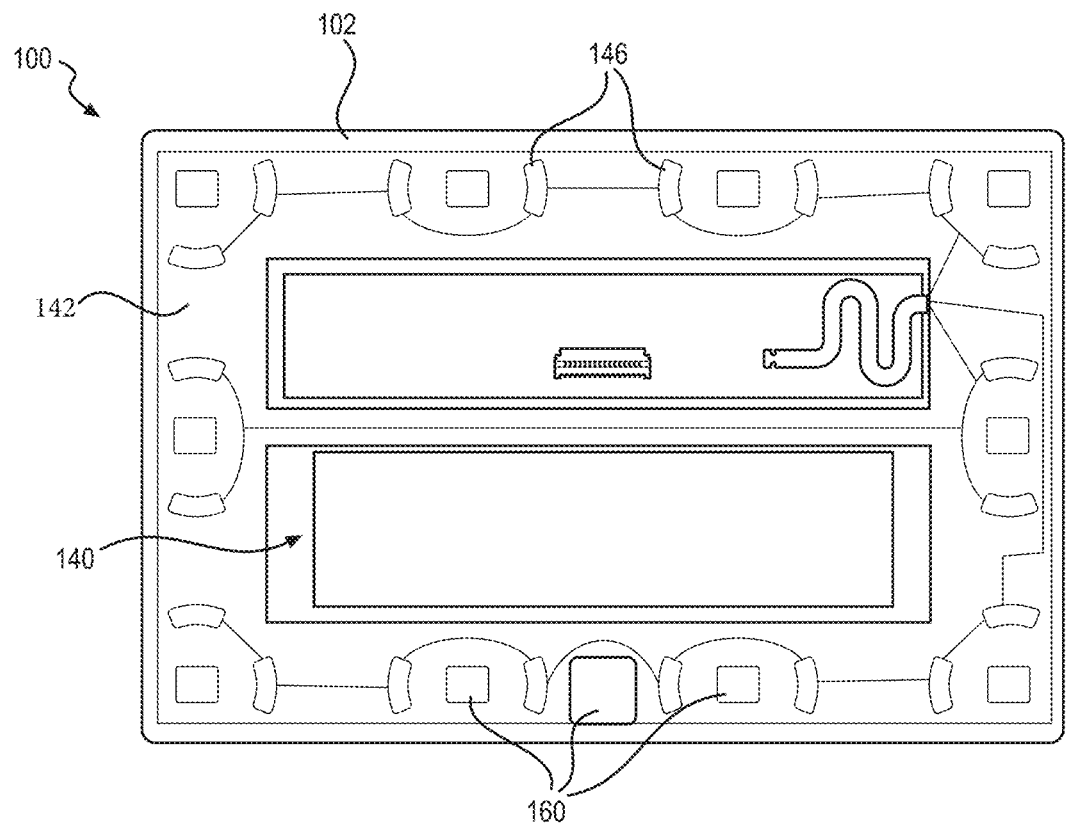
FIGS. 12A and 12B are schematic representations of the system.
Figure 12B:
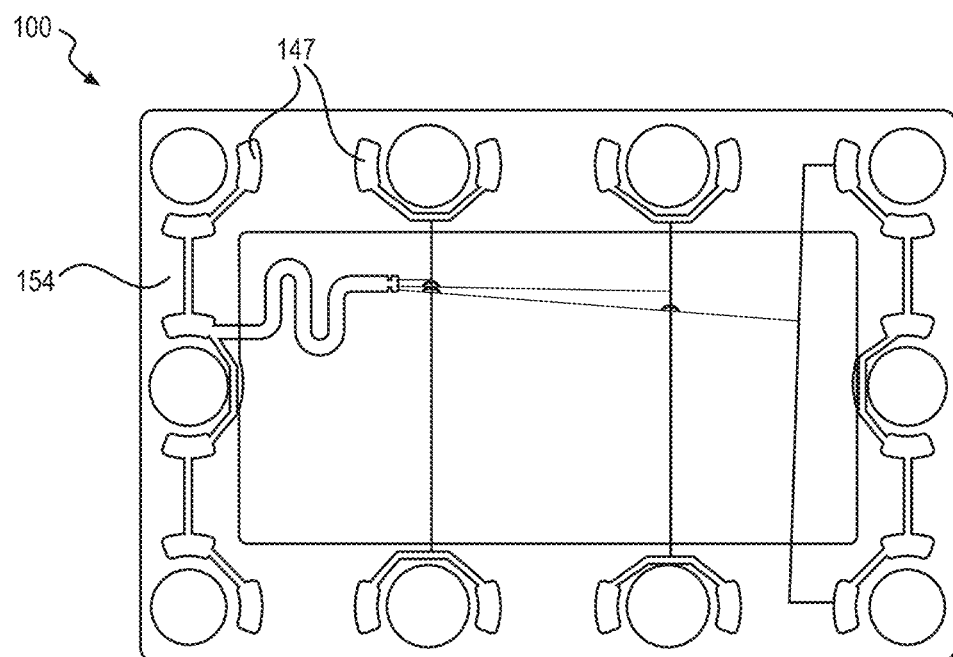

Generally, the system 100 includes a set of spring elements 162: coupled (e.g., bonded, riveted, soldered) to the substrate 102 at the set of support locations; configured to support the substrate 102 on a baseplate 166 coupled to a chassis 192 of a computing device; and configured to yield to displacement of the substrate 102 downward toward the baseplate 166 responsive to forces applied to the touch sensor surface 172. In one implementation, as shown in FIGS. 11A and 11B, the substrate 102 defines a rectangular geometry with support locations: proximal the perimeter of this rectangular geometry; and proximal a center of this rectangular geometry. Accordingly, the set of spring elements 162 can cooperate to support the perimeter and the center of the substrate 102 against the baseplate 166 of the computing device. In this implementation, the substrate 102 and the cover layer 170—arranged over the capacitance touch sensor—can cooperate to form a semi-rigid structure that resists deflection between the set of support locations.

For example, with the perimeter of the substrate 102 supported by the set of spring elements 162, the substrate 102 and the cover layer 170 can exhibit less than 0.3 millimeters of deflection out of a nominal plane when a force of ~1.6 Newtons (i.e., 165 grams, equal to an "click" input force threshold) is applied to the center of the touch sensor surface 172. The substrate 102 and the cover layer 170 can therefore cooperate to communicate this applied force to the perimeter of the substrate 102 and thus into the set of spring elements 162 below. As described above, the set of spring elements 162 can support the perimeter and the center of the substrate 102, and the substrate 102 and the cover layer 170 can form a substantially rigid structure in order to achieve a ratio of applied force to vertical displacement of the substrate 102 that is approximately consistent or that changes linearly across the total area of the touch sensor surface 172.

4.2.1 Spring Force

Furthermore, in the foregoing implementation, the system 100 can include: a first set of spring elements 162—characterized by a first spring constant—coupled to a first set of support locations proximal corners of the substrate 102; and a second set of spring elements 162—characterized by a second spring constant less than the first spring constant—coupled to a second set of support locations proximal edges of the substrate 102.

4.2.2 Individual Spring Elements

In another implementation, the system 100 includes a set of discrete spring elements arranged in (e.g., bonded to, press-fit into) individual spring receptacles in the baseplate 166 and coupled (e.g., bonded to the bottom layer 140 of the substrate 102 across the set of support locations.

4.2.3 Preloaded Spring Elements

As described above, the substrate 102 can also be biased against the set of spring elements 162 of the baseplate 166 in order to: preload the spring elements; achieve a target nominal air gap between the set of sense electrode of the substrate 102 and the set of coupling regions (e.g., drive electrodes) of the base plate; and achieve baseline capacitance values that fall within sensible ranges for each capacitance sensor.

Thus, the system 100 can enable the controller 190 to detect each sense electrode moving both toward and away from their respective drive electrode on the baseplate 166 based on changes in capacitance, such as responsive to: a force applied to the touch sensor surface 172 over a capacitance sensor; and a force applied to the touch sensor surface 172 remote from the capacitance sensor.

4.3 Integral Baseplate and Spring Elements

In one implementation, the baseplate 166 defines a single unitary (e.g., metallic) structure: defining the set of coupling regions (e.g., drive electrodes) and the set of spring elements 162 arranged across the coupling layer 154 of the baseplate 166; and arranged below the substrate 102. In this implementation, the unitary metallic structure can define: a nominal plane between a chassis 192 and the substrate 102; and a set of capacitance coupling regions adjacent (e.g., aligned to, coaxial with) the set of support locations and the set of electrodes (e.g., sense electrodes) on the bottom layer 140 of the substrate 102. In this implementation, each spring element: can be formed in the unitary metallic structure (e.g., by stamping); can extend from its adjacent capacitance coupling region; can define a stage coupled to the corresponding support location on the bottom layer 140 for the substrate 102 (e.g., via a deflection spacer); and can be configured to return approximately the nominal plane in response to absence of a touch input applied to the touch sensor surface 172. Additionally, in this implementation the set of coupling regions (e.g., drive electrodes): can be formed in the unitary metallic structure (e.g., by a conductive trace printed on the baseplate 166); can be located proximal its adjacent capacitance coupling region; and can be configured to capacitively couple the set of electrodes (e.g., sense electrodes) on the bottom layer 140 of the substrate 102 to define the set of capacitance force sensors.

In the foregoing implementation, the unitary structure can be rigidly mounted to the chassis 192 of a computing device to therefore: rigidly locate the capacitance coupling regions relative to the substrate 102 and within a nominal plane; and enable the stages of the spring elements to move vertically relative to the nominal plane and the capacitance coupling regions defined by the unitary metallic structure.

Thus, each sense electrode on the bottom layer 140 of the substrate 102 can: capacitively couple to an adjacent drive electrode on an adjacent capacitance coupling region on the unitary metallic structure; and move toward this adjacent capacitance coupling region in response to application of a force on the touch sensor surface 172 proximal the capacitance force sensor, which changes the capacitance value of the capacitance force sensor proportional to compression of the adjacent spring element and therefore proportional to the portion of force carried by the spring element.

Furthermore, in this implementation, the unitary metallic structure can be fastened directly to the chassis 192 of the computing device. Alternatively, the unitary metallic structure can be mounted (e.g., fastened, riveted, welded, crimped) to a separate chassis 192 interface that is then fastened or otherwise mounted to the chassis 192. In another implementation, the baseplate 166 defines a single unitary (e.g., metallic) structure including the set of coupling regions (e.g., drive electrodes) arranged across the coupling layer 154 of the baseplate 166. In this implementation, the system 100 further includes a set of deflection spacers arranged in abutting engagement across the coupling layer 154 of the baseplate 166. In this implementation, the set of deflection spacers are configured to compress in response to applied force on the touch sensor surface 172, Therefore, the unitary structure can define a nominal place between a chassis 192 and the substrate 102.

4.4 Stamped Baseplate

In one implementation, as shown in FIGS. 4 and 5, the system 100 can include a baseplate 166 including a set of spring elements 162 fabricated (e.g., stamped) about a periphery of the baseplate 166: the set of electrodes (e.g., sense electrodes) arranged on the bottom layer 140 of the substrate 102; and a coupling layer 154 arranged on a top side of the baseplate 166. In particular, the system 100 can include the baseplate 166: defining a single unitary structure formed of a flexible metallic material; arranged below the substrate 102; and including the set of spring elements 162 formed adjacent to the coupling layer 154 on the baseplate 166. In this implementation, the set of spring elements 162 are individually or simultaneously fabricated (e.g., stamped) on the unitary metallic structure to define, for each spring element: a platform arranged adjacent to a lateral edge of the baseplate 166 and configured to support a spacer element; and a channel extending about the platform and interposed between the platform and a lateral side of the baseplate 166. The platform is configured to: laterally and longitudinally locate the system 100 over the chassis 192; and deflect inwardly and outwardly from a nominal plane defined by the single unitary structure. Additionally, the system 100 includes a set of spacer elements 160: arranged at the platform for each spring element in the set of spring elements 162; interposed between the substrate 102 and the baseplate 166; and locating the bottom layer 140 of the substrate 102 in alignment with the coupling layer 154 on the baseplate 166 to define a capacitance force sensor.

Thus, responsive to application of a touch input over the touch sensor surface 172, the system 100: deflects the platform below the nominal plane defined by the baseplate 166; advances the substrate 102 toward the baseplate 166; and induces changes in electrical values for the capacitance force sensor. The system 100 can then: read a set of electrical values from sense electrodes at the bottom layer 140 of the substrate 102; and interpret a force magnitude for a touch input applied over the touch sensor surface 172 based on the set of electrical values.

4.4.1 Stamped Baseplate: Scissor Spring

Figure 8:
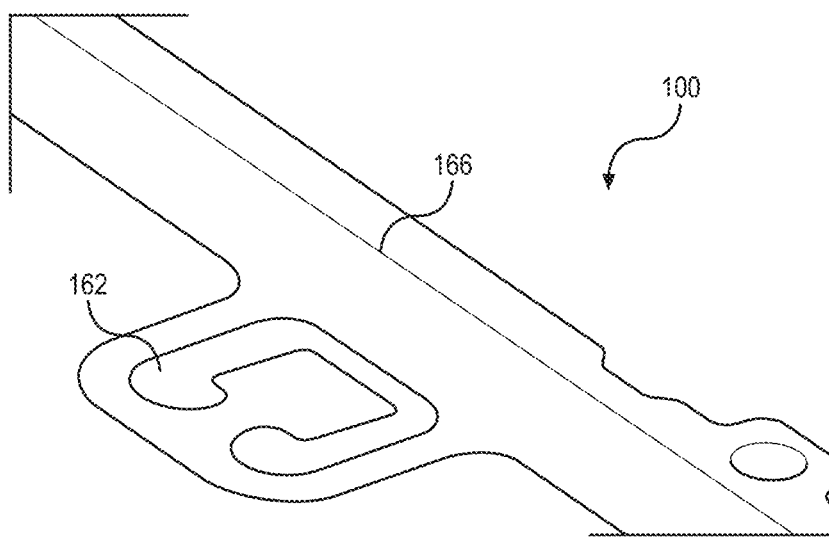
FIG. 8 is a schematic representation of the system.

In one implementation, as shown in FIG. 8, the system 100 includes a spring element defining a scissor spring fabricated (e.g., stamped) on the baseplate 166. In this implementation, the spring element includes: a platform; a bridge; and a channel. The platform: is arranged proximal a lateral side of the baseplate 166; is arranged proximal a drive electrode in the coupling layer 154 on the baseplate 166; and is configured to support a spacer element. The bridge: defines a first end integrally connected to the baseplate 166; defines a second end integrally connected to the platform; and is configured to laterally deflect responsive to force applied on the platform. The channel: extends about the platform; is interposed between the platform and a lateral side of the baseplate 166; and terminates at the bridge connecting the platform to the baseplate 166. In one example, the channel can define a horseshoe shape that encircles the platform. In another example, the spring element can include a set of channels that encircle the platform.

During operation, the system 100 can: maintain the platform in a nominal position flush with the nominal plane of the baseplate 166; and deflect the platform below the nominal position responsive to touch inputs applied on the touch sensor surface 172. The system 100 can then include each spring element, in the set of spring elements 162, defining a scissor spring and arranged about a lateral side of the baseplate 166.

4.4.2 Stamped Baseplate: Cantilever Spring

Figure 9:
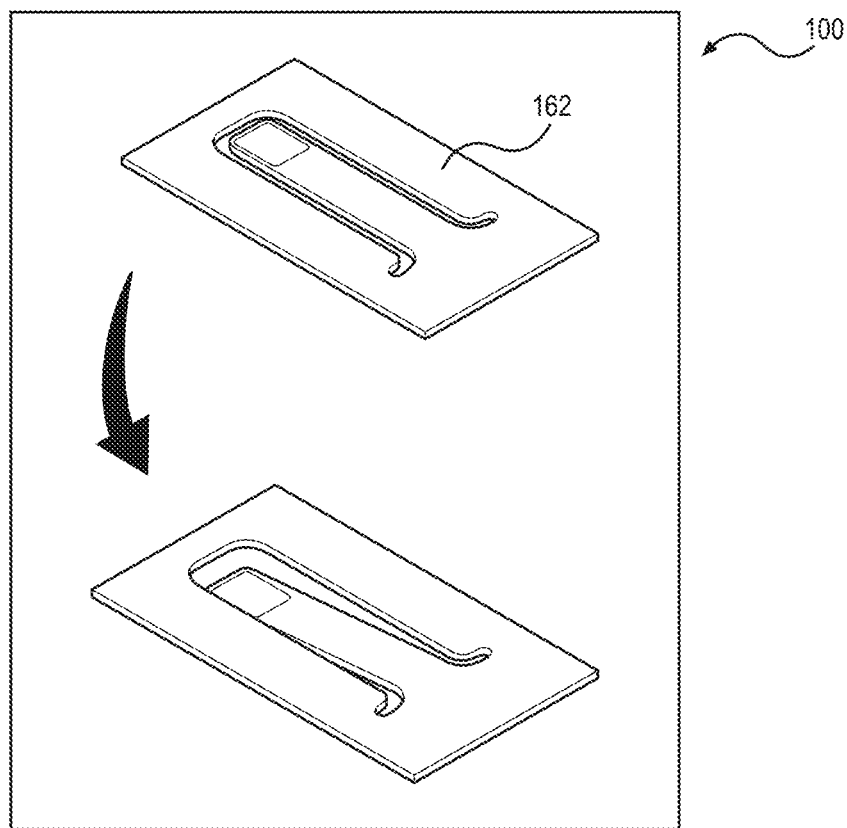
FIG. 9 is a schematic representation of the system.

In one implementation, as shown in FIG. 9, the system 100 includes a spring element defining a cantilever spring fabricated (e.g., stamped) on the baseplate 166. In this implementation, the spring element includes: a beam; a platform; and a channel. The beam: extends laterally across the baseplate 166; defines a first end integrally connected to the baseplate 166; and defines a second end, opposite the first end, located proximal a lateral side of the baseplate 166. The platform: is arranged at the second end of the beam; is arranged proximal a drive electrode in the coupling layer 154 on the baseplate 166; and is configured to support a spacer element. The channel: extends about the beam to define a rectangular geometry of the beam; envelops the second end of the beam including the platform; and terminates at the first end of the beam integrally connected to the baseplate 166. In this implementation, forces experienced at the second end of the beam will result in greater deflection of the platform than forces experienced at the first end of the beam. The system 100 can thus: include a set of spring elements 162, each spring element defining a cantilever spring, arranged across the baseplate 166; locate the platform, for each spring element in the set of spring elements 162, proximal a lateral side of the baseplate 166; and locate the drive electrodes in the coupling layer 154 directly adjacent to the platform on the spring element in order to increase sensitivity to changes in electrical values at the capacitance force sensor during operation of the system 100.

4.4.3 Stamped Baseplate: Spiral Spring

Figure 6:
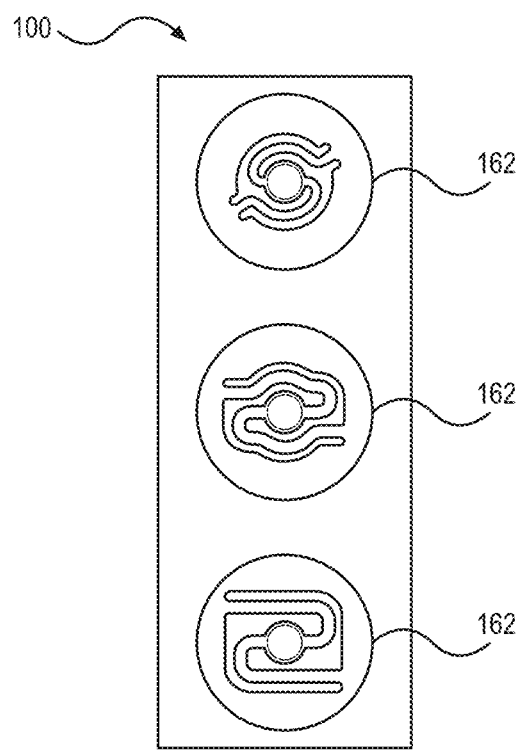
FIG. 6 is a schematic representation of the system.
Figure 7:
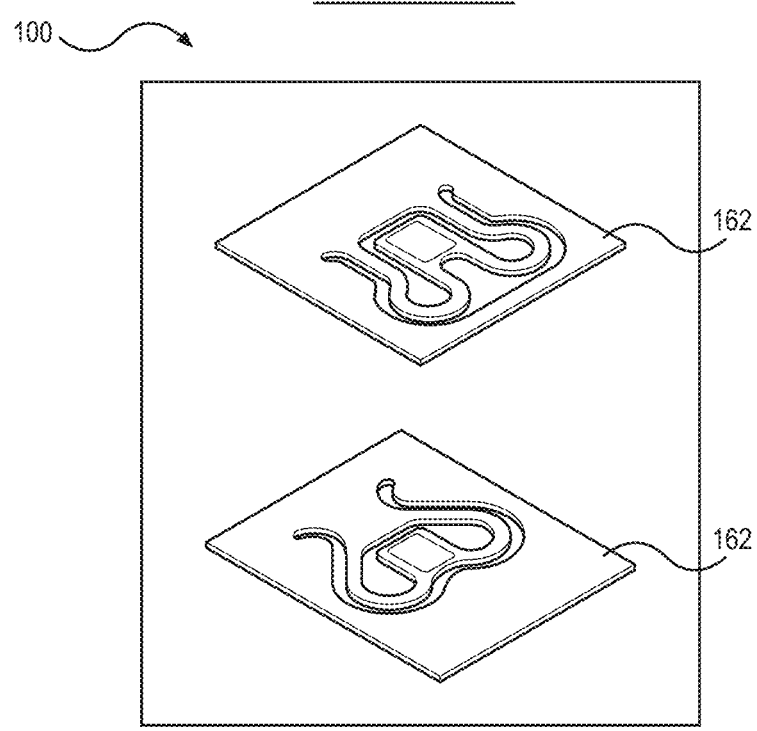
FIG. 7 is a schematic representation of the system.

In one implementation, as shown in FIGS. 6 and 7, the system 100 includes a spring element defining a spiral spring fabricated (e.g., stamped) on the baseplate 166. In this implementation, the spring element includes: a platform; a bridge; a first spiral channel; and a second spiral channel. The platform: is arranged proximal a lateral side of the baseplate 166; is arranged proximal a drive electrode in the coupling layer 154 on the baseplate 166; and is configured to support a spacer element. The bridge: includes a first end integrally connected to the baseplate 166; includes a second end, opposite the first send, integrally connected to the baseplate 166; and includes the platform located between the first end and the second end of the bridge. The first channel defines a first spiral encircling the platform. The second channel: defines a second spiral, opposite the first channel, encircling the platform to form the spiral spring.

The system 100 can thus: include a set of spring elements 162, each spring element defining a spiral spring, arranged across the baseplate 166; include the coupling layer 154 encircling each spring element, in the set of spring elements 162; and locate the drive electrodes in the coupling layer 154 directly adjacent to the platform on the spring element in order to increase sensitivity to changes in electrical values at the capacitance force sensor during operation of the system 100.

4.5 Example: Stamped Baseplate+Windowed Trackpad

In one example, as shown in FIG. 4, the system 100 can form a self-contained, compact windowed trackpad configured to characterize touch inputs from a user. In this example, the system 100 can include: a stamped baseplate 166; a coupling layer 154; a substrate 102; a cover layer 170; and a controller 190. The stamped baseplate 166: is formed of a unitary metallic structure (e.g., sheet metal); is stamped to form a rectangular geometry; and includes a set of spring elements 162 stamped about a periphery of the unitary metallic structure. The coupling layer 154: is arranged about a periphery of the unitary metallic structure; and includes a set of coupling regions (e.g., drive electrodes, conductive traces) arranged proximal the set of spring elements 162 on the baseplate 166; and is connected to the controller 190. The substrate 102: defines a rectangular geometry approximating the rectangular geometry of the baseplate 166; is arranged over the baseplate 166; and includes a bottom layer 140 and a top layer 104. The bottom layer 140 includes a set of electrodes (e.g., sense electrodes): connected to the controller 190; arranged about a periphery of the bottom layer 140; coupling the set of spring elements 162 (e.g., via spacer elements) of the baseplate 166; aligned to the set of coupling regions on the coupling layer 154; and capacitively coupling the set of coupling regions to form a set of capacitive force sensors. The cover layer 170 is arranged over the top layer 104 of the substrate 102.

Thus, the controller 190 can: read a set of capacitance values from the set of force sensors (i.e., formed by capacitive coupling between the set of electrodes and the set of coupling regions); detect changes in capacitance across the set of force sensors representing deviations from baseline capacitance across the set of force sensors; and interpret a force magnitude applied over the cover layer 170 based on changes in capacitance. In this example, the system 100 can also include: a set of drive and sense electrode pairs 105 arranged across the top layer 104 of the substrate 102; and the cover layer 170 arranged over the set of drive and sense electrode pairs 105 to define a touch sensor surface 172. Additionally, the system 100 can include: a multi-layer inductor 150 formed into layers of the substrate 102 (e.g., between the top layer 104 and the bottom layer 140); and a set of magnetic elements 181 arranged within the rectangular geometry of the baseplate 166 and facing the multi-layer inductor 150. Thus, the controller 190 can: read electrical values from the set of drive and sense electrode pairs 105; detect a touch input at a first location on the cover layer 170 based on the electrical values; as described above, detect a force magnitude for the touch input; and, in response to a force magnitude exceeding a threshold force magnitude, drive current through the multi-layer inductor 150 to induce inductive coupling between the set of magnetic elements 181 and the multi-layer inductor 150, thereby oscillating the substrate 102 and therefore the cover layer 170.

4.6 Example: Stamped Baseplate+Seamless Trackpad

In one example, as shown in FIG. 5, the system 100 can form a self-contained, seamless trackpad configured to characterize touch inputs from a user. In this example, the system 100 can include: a stamped baseplate 166; a coupling layer 154; a substrate 102; a cover layer 170; and a controller 190. The stamped baseplate 166 is formed of a unitary metallic structure (e.g., sheet metal) of a rectangular geometry defining a nominal plane. In this example, the stamped baseplate 166 is fabricated (e.g., stamped) to define: a center section 191 inset from the nominal plane; a first side section 192 adjacent the center section 191 and planar to the nominal plane; a second side section 193, opposite the first side section 192, and planar to the nominal plane; and a set of spring elements 162 stamped about a periphery of the unitary metallic structure. In this example, the unitary metallic structure can further include: a first relief 167 arranged between the first side section 192 and the center section 191; and a second relief 168 arranged between the second side section 193 and the center section 191. The substrate 102: defines a rectangular geometry approximating a rectangular geometry of the center section 191 of the baseplate 166; is arranged within the center section 191 and planar to the nominal plane; and includes a bottom layer 140 and a top layer 104. The cover layer 170: is arranged over the top layer 104 of the substrate 102; extends across the first side section 192, the second side section 193, and the center section 191 of the baseplate 166; and defines a touch sensor surface 172 over the center section 191. Thus, the controller 190 can: read a set of capacitance values from the set of force sensors (i.e., formed by capacitive coupling between the set of electrodes and the set of coupling regions); detect changes in capacitance (e.g., uniform change, non-uniform change) in the set of capacitance values, such as from stored baseline capacitance values; and interpret a force magnitude applied over the cover layer 170 based on the change in capacitance.

In this example, the system 100 can also include: a set of drive and sense electrode pairs 105 arranged across the top layer 104 of the substrate 102; and the cover layer 170 arranged over the set of drive and sense electrode pairs 105 to define a touch sensor surface 172 at the center section 191. Additionally, the system 100 can include: a multi-layer inductor 150 formed into layers of the substrate 102 (e.g., between the top layer 104 and the bottom layer 140); and a set of magnetic elements 181 arranged within the rectangular geometry of the baseplate 166 and facing the multi-layer inductor 150. The controller 190 can then: read electrical values from the set of drive and sense electrode pairs 105; detect a touch input at a first location on the cover layer 170 based on the electrical values; as described above, detect a force magnitude for the touch input; and, in response to a force magnitude exceeding a threshold force magnitude, drive current through the multi-layer inductor 150 to induce inductive coupling between the set of magnetic elements 181 and the multi-layer inductor 150, thereby oscillating the substrate 102 and therefore the cover layer 170.

5. Spacer Elements

As described in U.S. patent application Ser. No. 17/191,636, filed on 3 Mar. 2021, which is incorporated in its entirety by this reference: the top layer 104 of the substrate 102 includes a set of drive and sense electrode pairs 105 arranged in a grid array and at a first density; and a bottom layer 140 of the substrate 102 includes a set of electrodes (e.g., a sparse perimeter set of sense electrodes, as described above) located proximal a perimeter of the substrate 102 at a second density less than the first density. In this implementation, the system 100 further includes a set of spacer elements 160 (e.g., short elastic columns or buttons, adhesive films) coupled to the bottom layer 140 of the substrate 102 at each support location, in the set of support locations, at the substrate 102 to support the substrate 102 on the chassis 192 of the device. In particular, each spacer element: is arranged (e.g., bonded) to a support location at the bottom layer 140 of the substrate 102 proximal a set of electrodes (e.g., sense electrode); and is configured to compress responsive to a load applied on the touch sensor surface 172 that compresses the spacer element against the substrate 102 thereby displacing the substrate 102 toward the coupling layer 154 on the baseplate 166 in order to effect electrical values between the set of electrodes on the substrate 102 and the set of coupling regions on the coupling layer 154. Accordingly, in this implementation, the controller 190 can: read a first set of electrical values—representing capacitive coupling between drive and sense electrode pairs—from the set of drive and sense electrode pairs 105; and detect a first input at a first location on the touch sensor surface 172 based on deviation of electrical values—read from a first set of drive and sense electrode pairs 105 adjacent the first location—from baseline capacitance values stored for this first set of drive and sense electrode pairs 105. During this same scan cycle, the controller 190 can also: read a second set of electrical values (e.g., capacitive coupling)—representing compression of the set of spacer elements 160—from the set of electrodes; and interpret a force magnitude of the first input based on magnitudes of deviations of electrical (e.g., capacitance) values from baseline electrical values across the set of electrodes.

6. Controller and Operation

Generally, the system 100 includes the controller 190 configured to, during a scan cycle: read a set of capacitance values—from the set of capacitance force sensors—representing compression of the set of spring elements 162 between the baseplate 166 and the substrate 102; and interpret a distribution of forces applied to the touch sensor surface 172 during the scan cycle based on this set of capacitance values and force models representing spring constants of the set of spring elements 162. In one example, during a first time period in a setup routine or calibration cycle in which no touch input is applied to the touch sensor surface 172, the controller 190 can read capacitance values from the set of capacitance force sensors and store these capacitance values as baseline capacitances—corresponding to absence of a touch input on the touch sensor surface 172—for these pressure sensors. Furthermore, during a second time period in the setup routine or calibration cycle in which a touch input is applied (e.g., with a stylus or finger) to a first region of the touch sensor surface 172 proximal a first spring element: the first spring element yields to the touch input; and the substrate 102 advances toward the baseplate 166—thus advancing the electrode (e.g., sense electrode) on the substrate 102 toward the drive electrode on the baseplate 166—by a distance proportional to a force magnitude of the touch input.

Accordingly, the controller 190 can then: read a first capacitance value from the first capacitance force sensor during a scan cycle spanning a first time period; calculate a first change in capacitance at the first capacitance force sensor during the first time period based on a difference between the first capacitance value and a stored baseline capacitance value from the first capacitance force sensor; and interpret a portion of the force magnitude of the touch input carried by the first spring element based on (e.g., proportional to) the first change in capacitance value and a stored force model that relates deviation from baseline capacitance to force carried by the first spring element (e.g., based on a spring constant of the first spring element).

In this example, the controller 190 can implement this process for each other discrete capacitance force sensor of the system 100 in order to transform changes in capacitance values detected at each pressure sensor into portion of the total force magnitude of the touch input carried by each spring element during the scan cycle. The controller 190 can then sum these portions to calculate the total force magnitude of the touch input during the first time period. Additionally or alternatively, the controller 190 can fuse these portions of the force magnitude carried by each capacitance force sensor, the known positions of the capacitance force sensors in the system 100, and locations of multiple concurrent, discrete inputs detected on the touch sensor surface 172 via the capacitance touch sensor in order to estimate the force applied by each discrete input.

7. Non-Uniform Capacitance

Generally, the system 100 can: receive application of a touch input on the touch sensor surface 172 resulting in un-even deflection of the substrate 102 toward the baseplate 166 from a fixed offset distance; read a set of capacitance values from the set of electrodes (e.g., sense electrodes) arranged across the bottom layer 140 of the substrate 102; detect non-uniform capacitance values—such as from baseline capacitance values—in the set of capacitance values; and interpret a force magnitude for a touch input applied to the cover layer 170 based on the non-uniform capacitance values. In particular, the capacitance values between the set of electrodes (e.g., sense electrodes) and the set of coupling regions (e.g., drive electrodes) are: directly proportional to the area of the electrodes; and inversely proportional to an offset distance between the set of electrodes (e.g., sense electrodes) and the set of coupling regions (e.g., drive electrodes).

7.1 Un-Even Substrate Deflection

Figure 3:
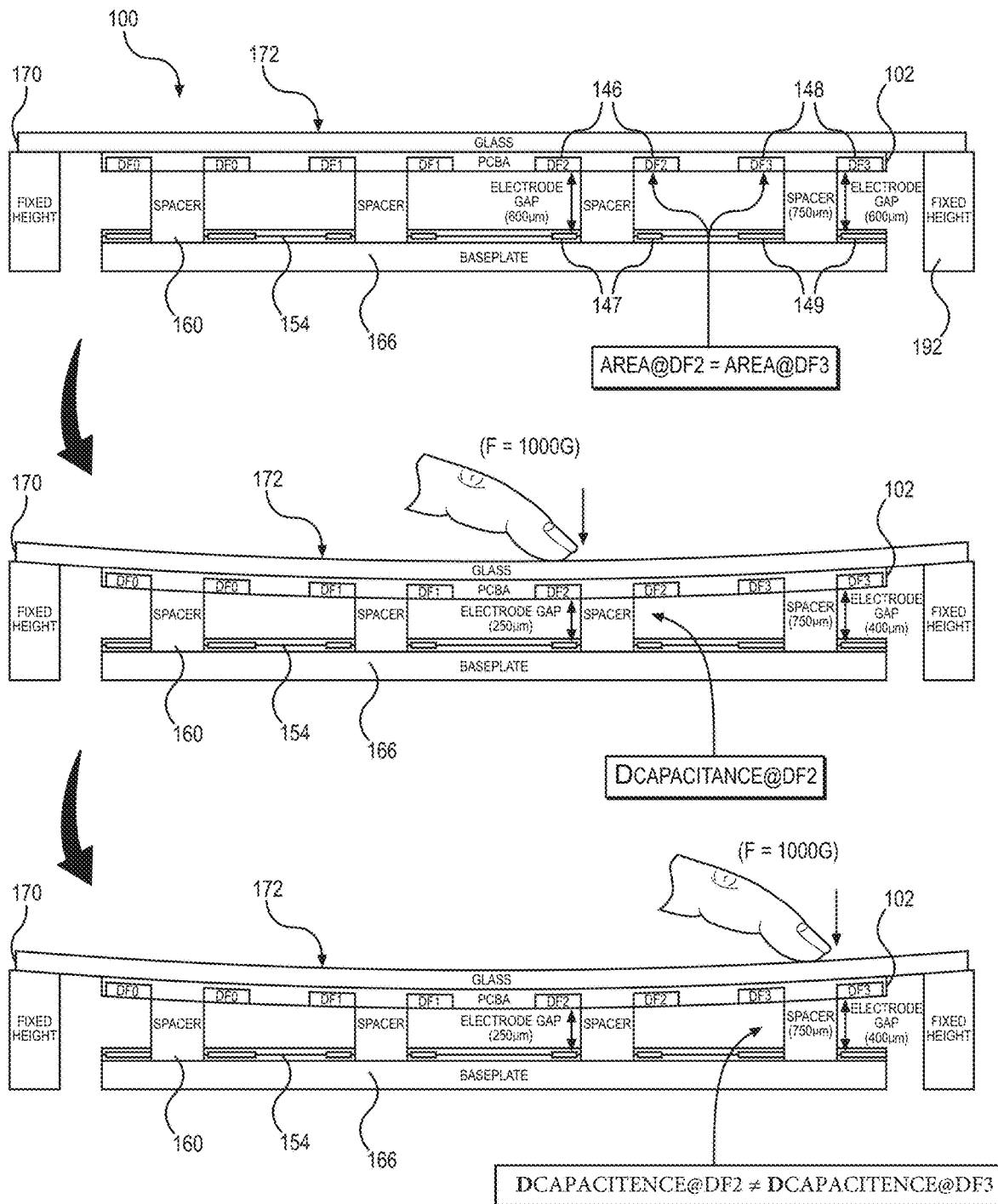
FIG. 3 is a schematic representation of the system.

In one implementation, as shown in FIG. 3, the system 100 can: receive application of a touch input on the touch sensor surface 172; and deflect the substrate 102 arranged below the touch sensor surface 172 toward the baseplate 166 and thus decrease an offset distance between the set of electrodes (e.g., sense electrodes) on the bottom layer 140 of the substrate 102 and the set of coupling regions (e.g., drive electrodes) across the baseplate 166 resulting in an increase in capacitance values. In this implementation, the system 100 includes: the substrate 102 arranged over the baseplate 166 at a target offset distance; a first set of spacer elements 160 arranged proximal a center region of the substrate 102; and a second set of spacer elements 160 arranged proximal lateral edges of the substrate 102.

Upon application of the touch input at the touch sensor surface 172 at a target force magnitude (e.g., 1000 grams), the first set of spacer elements 160 arranged proximal the center region of the substrate 102 compresses and therefore reduces the target offset distance at the center region of the substrate 102 to a first offset distance less than the target offset distance. Additionally, the second set of spacer elements 160 arranged proximal the lateral edges of the substrate 102 compresses and therefore reduces the target offset distance at the lateral edges of the substrate 102 to a second offset distance greater than a first offset distance and less than the target offset distance.

In the aforementioned implementation, the system 100 can also include: a first electrode 146 (e.g., sense electrodes) arranged proximal a center region of the bottom layer 140 of the substrate 102; a first set of support locations arranged at the bottom layer 140 proximal the first set of set of electrodes (e.g., sense electrodes) on the bottom layer 140; a first coupling region 147 (e.g., drive electrode) across the baseplate 166 in alignment with the first set of set of electrodes (e.g., sense electrodes) to define a first set of capacitance force sensors; and a first set of spacer elements 160 supporting the first electrode 146 (e.g., sense electrodes) over the first coupling region 147 (e.g., drive electrode) at a target offset distance. Additionally, in this example, the system 100 includes: a second set of set of electrodes (e.g., sense electrodes) arranged proximal lateral edges of the bottom layer 140 of the substrate 102; a second set of support locations arranged at the bottom layer 140 proximal the second electrode 148 (e.g., sense electrode) on the bottom layer 140; a second coupling region 149 (e.g., drive electrode) across the baseplate 166 in alignment with the second electrode 148 (e.g., sense electrode) to define a second set of capacitance force sensors; and a second set of spacer elements 160 supporting the second electrode 148 (e.g., sense electrode) over the second coupling region 149 (e.g., drive electrode) at the target offset distance.

Thus, the height difference between the first offset distance and the second offset distance results in non-uniform electrical values across the first set of capacitance force sensors and the second set of capacitance force sensors. The system 100 can then interpret a force magnitude for the touch input applied to the touch sensor surface 172 based on the non-uniform electrical values.

In one example, prior to application of a touch input on the touch sensor surface 172, the system 100 can maintain a nominal target offset distance (e.g., 600 micrometers) between the substrate 102 and the baseplate 166. Subsequently upon application of the touch input (e.g., 1000 grams) on the touch sensor surface 172, the system 100: deflects the center region of the substrate 102 toward the baseplate 166, thereby reducing the nominal target offset distance between the first electrode 146 (e.g., sense electrodes) and the first coupling region 147 (e.g., drive electrode) to a first offset distance (e.g.,250 micrometers); and deflects the lateral region of the substrate 102 toward the baseplate 166 thereby reducing the nominal target offset distance between the second electrode 148 (e.g., sense electrode) and the second coupling region 149 (e.g., drive electrode) to a second offset distance (e.g., 400 micrometers). The system 100 can then: read a first set of capacitance values from the first set of capacitance force sensors; read a second set of capacitance values, less than the first set of capacitance values, from the second set of capacitance force sensors; and interpret a force magnitude applied over the touch sensor surface 172 based on the first set of capacitance values and the second set of capacitance values.

Therefore, the system 100 can: read capacitance values from the first electrode 146 (e.g., sense electrodes) and the second electrode 148 (e.g., sense electrode); and interpret force magnitudes applied to the touch sensor surface 172 based on varying capacitance values resulting from uneven deflection across the center region of the substrate 102 and the lateral edges of the substrate 102.

7.2 Fixed Height Configuration

In one implementation, as shown in FIG. 3, the system 100 can define: a maximum capacitance value (e.g., two picofarads) between the capacitance force sensors arranged below the touch sensor surface 172; and a target dimension for the set of electrodes (e.g., sense electrodes) arranged across the bottom layer 140 of the substrate 102 and the set of coupling regions (e.g., drive electrodes) arranged across the baseplate 166. As described above, the center region of the substrate 102 deflects at a greater offset distance than the lateral edges of the substrate 102 resulting in an increase in capacitance values between the first electrode 146 (e.g., sense electrodes) and the first coupling region 147 (e.g., drive electrode). Thus, the system 100 can include the first set of deflection spacers arranged below the center region of the substrate 102 and configured to: couple the substrate 102 to the baseplate 166 to define a nominal offset distance; and compress toward a minimum offset distance to maintain the capacitance values between the first electrode 146 (e.g., sense electrodes) and the first coupling region 147 (e.g., drive electrode) below the maximum capacitance value.

For example, the system 100 can: define a maximum capacitance value (e.g., two picofarads) between the set of electrodes (e.g., sense electrodes) and the set of coupling regions (e.g., drive electrodes); and define a target electrode area (e.g., 28 millimeters squared) for the set of electrodes (e.g., sense electrodes) and the set of coupling regions (e.g., drive electrodes). As described above, the capacitance value for the set of capacitance force sensors is: directly proportional to the electrode area of the set of capacitance force sensors; and inversely proportional to the distance between the set of electrodes (e.g., sense electrodes) and the set of coupling regions (e.g., drive electrodes). Therefore, the system 100 can define a minimum offset distance (e.g., 124 micrometers) between the set of electrodes (e.g., sense electrodes) and the set of coupling regions (e.g., drive electrodes).

Thus, the system 100 can include a set of spacer elements 160 configured to: maintain nominal offset distance (e.g., 600 micrometers) between the set of electrodes (e.g., sense electrodes) and the set of coupling regions (e.g., drive electrodes); and, responsive to application of a force input (e.g., 1000 grams) on the touch sensor surface 172, maintain a target offset distance between the set of electrodes (e.g., sense electrodes) and the set of coupling regions (e.g., drive electrodes) above the minimum offset distance (e.g., 124 micrometers), thereby outputting capacitance values less than the maximum capacitance value (e.g., two picofarads). The system 100 can then: read a set of capacitance values from the set of electrodes (e.g., sense electrodes) across the bottom layer 140 of the substrate 102; and interpret a force magnitude for the force input applied on the touch sensor surface 172 in response to the set of capacitance values falling below the maximum capacitance value.

Therefore, the system 100 can: receive application of a force input on the touch sensor surface 172; deflect the substrate 102 toward the baseplate 166 responsive to application of the force input; maintain a target offset distance between the set of electrodes (e.g., sense electrodes) and the set of coupling regions (e.g., drive electrodes) greater than a minimum offset distance; and interpret a force magnitude for the force input based on electrical values read from the set of electrodes (e.g., sense electrodes) during deflection of the substrate 102.

8. Uniform Capacitance

Generally, the system 100 can be modified—such as by modifying dimensions (e.g., surface area) of the drive and sense electrode pairs and modifying the offset distance between the set of electrodes (e.g., sense electrodes) and the set of coupling regions (e.g., drive electrodes)—in order to achieve uniform changes in capacitance values between the set of electrodes on the bottom layer 140 of the substrate 102 and the coupling layer 154 responsive to force applied to the cover layer 170. The system 100 can: receive application of a touch input on the touch sensor surface 172 resulting in deflection of the substrate 102 toward the baseplate 166 from a fixed offset distance; read a set of capacitance values from the set of electrodes (e.g., sense electrodes) arranged across the bottom layer 140 of the substrate 102; detect uniform changes in capacitance values—such as from baseline capacitance values—in the set of capacitance values; and interpret a force magnitude for the touch input applied to the cover layer 170 based on the uniform changes in capacitance values.

8.1 Variable Electrode Area Configuration

In one implementation, as shown in FIG. 1, the system 100 can include: the first set of capacitance force sensors proximal the center region of the substrate 102 defining a first electrode area; and the second set of capacitance force sensors proximal the lateral edges of the substrate 102 defining a second electrode area greater than the first electrode area. In this implementation, the second set of capacitance force sensors compresses at an offset distance less than the first set of capacitance force sensors proximal the center region of the substrate 102. Thus, the system 100 can be modified to define the first electrode area and the second electrode area in order to output uniform change in capacitance values across the first set of capacitance force sensors and the second set of capacitance force sensors.

In one example, the system 100 defines: a maximum capacitance value (e.g., two picofarads) for the first set of capacitance force sensors and the second set of capacitance force sensors; and a nominal offset distance (e.g., 600 micrometers) between the set of electrodes (e.g., sense electrodes) and the set of coupling regions (e.g., drive electrodes). Additionally, upon application of a maximum force input (e.g., 1000 grams) on the touch sensor surface 172: the first set of capacitance force sensors defines a first electrode gap (e.g., 250 micrometers); and the second set of capacitance force sensors defines a second electrode gap greater than the first electrode gap (e.g., 400 micrometers). Thus, the system 100 can be modified to define: a first electrode area (e.g., 56.5 millimeters squared) corresponding to the maximum electrode area to prevent exceeding the maximum capacitance value at the first set of capacitance force sensors; and a second electrode area greater than the first electrode area (e.g., 90.4 millimeters squared) corresponding to the maximum electrode area to prevent exceeding the maximum capacitance value at the second set of capacitance force sensors.

In the aforementioned example, the system 100 can then, during application of a force input on the touch sensor surface 172: detect a first change in capacitance values from the first set of capacitance force sensors; detect a second change in capacitance values approximating to the first change in capacitance values from the second set of capacitance force sensors; and interpret a force magnitude for the force input applied on the touch sensor surface 172 based on the first change in capacitance values and the second change in capacitance values.

Therefore, the system 100 can: receive application of a force input on the touch sensor surface 172, thereby non-uniformly deflecting the substrate 102 toward the baseplate 166; output uniform change in capacitance values—less than the maximum capacitance value—across the first set of capacitance force sensors and the second set of capacitance force sensors during application of the force input on the touch sensor surface 172; and interpret a force magnitude for the force input based on the uniform change in capacitance values read from the first set of capacitance force sensors and the second set of capacitance force sensors.

8.1.1 Uniform Capacitive Coupling+Baseline Capacitance

In one implementation, as shown in FIG. 1, the system 100 can include: a first electrode 146 (e.g., sense electrode) spanning a first area (e.g., annular area, rectangular area) on the substrate 102 proximal a center of the substrate 102 (i.e., a region of the substrate 102 experiencing high-deflection toward the baseplate 166 responsive a target force magnitude applied over the substrate 102); and a first coupling region 147 (e.g., drive electrode) capacitively coupling the first electrode 146 to form a first force sensor, such as characterized by a first baseline capacitance value based on the first area. Additionally, the system 100 can include: a second electrode 148 (e.g., sense electrode) spanning a second area (e.g., annular area, rectangular area)—different (e.g., greater than) from the first area—interposed between the first electrode 146 and a first edge of the substrate 102 (i.e., a region of the substrate 102 experiencing low-deflection toward the baseplate 166 responsive to a target force magnitude applied to over the substrate 102); and a second coupling region 149 (e.g., drive electrode) capacitively coupling the second electrode 148 to form a second force sensor, such as characterized by a second baseline capacitance value based on the second area.

In this implementation, the system 100 can receive application of a target force magnitude (e.g., 1000 grams): proximal the center of the substrate 102 in order to yield a target change in capacitance value (e.g., two picofarads) from the first force sensor; and proximal the first edge of the substrate 102 in order to yield the target change in capacitance value (e.g., two picofarads) from the second force sensor regardless of variations in deflections across the substrate 102 toward the baseplate 166. For example, during a first scan cycle, the system 100 can: detect a first touch input at a first location proximal the center of the substrate 102; read a first electrical value (e.g., capacitance value) from the first electrode 146 representing capacitive coupling between the first electrode 146 and the first coupling region 147 as a function of applied forces to the center of the substrate 102; and interpret a first force magnitude (e.g., 1000 grams) for the first touch input based on the first electrical value, such as based on a deviation from a first baseline capacitance value for the first force sensor. Additionally, during a second scan cycle, the system 100 can: detect a second touch input at a second location proximal the edge of the substrate 102; read a second electrical value (e.g., capacitance value)—approximating the first electrical values (e.g., +/−0.02 picofarads)—from the second electrode 148 representing capacitive coupling between the second electrode 148 and the second coupling region 149 as a function of applied forces proximal the edge of the substrate 102; and interpret a second force magnitude (e.g., 1000 grams)—approximating (e.g., +/−10 grams) the first force magnitude—based on the second electrical value, such as based on a deviation from a second baseline capacitance value for the second force sensor.

In this example, the system 100 can further include: a set of drive and sense electrode pairs 105 arranged on the top layer 104 of the substrate 102; and a cover layer 170 arranged over the set of drive and sense electrode pairs 105 to define a touch sensor surface 172. Thus, the system 100 can: during the first scan cycle, detect the first touch input at the first location based on electrical values read from the set of drive and sense electrode pairs 105 on the substrate 102; and, during the second scan cycle, detect the second touch input at the second location based on electrical values read from the set of drive and sense electrode pairs 105 on the substrate 102.

In another example, the system 100 includes a set of spacer elements 160 defining a nominal gap between the bottom layer 140 of the substrate 102 and the coupling layer 154. Accordingly, the first force sensor is then characterized by a first baseline capacitance value: directly proportional to the first area (e.g., 50 millimeters squared) of each electrode in the first set of electrodes; and inversely proportional to the nominal gap. Additionally, the second force sensor is then characterized by a second baseline capacitance value: directly proportional to the second area (e.g., 90 millimeters squared) of each electrode in the second set of electrodes; inversely proportional to the nominal gap; and greater than the first baseline capacitance value.

Thus, during a scan cycle, the system 100 can: detect a first touch input at a first location on the cover layer 170, such as proximal the center of the substrate 102; read a first capacitance value (e.g., two picofarads) from the first force sensor; and read a second capacitance value (e.g., two picofarads)—approximating (e.g., +/−0.2 picofarads) the first capacitance value—from the second force sensor. The system 100 can then: detect a first change in capacitance based on the first capacitance value and the first baseline capacitance value; detect a second change in capacitance based on the second capacitance value and the second baseline capacitance value; and interpret a first force magnitude (e.g., 1000 grams) for the first touch input based on the first change in capacitance and the second change in capacitance.

Therefore, the system 100 can, rather than yield non-uniform electrical values (e.g., capacitance values) across the first force sensor and the second force sensor responsive to application of a target force magnitude (e.g., 1000 grams) over the substrate 102, the system 100 can: responsive to application of the target force magnitude, yield uniform changes in electrical values across the first force sensor and the second force sensor; and interpret force magnitudes over the substrate 102 based on deviations—per unit force—from the uniform change in electrical values across the first force sensor and the second force sensor.

8.1.2 Variable Area+Thru-Mode Configuration

In one implementation, the system 100 can include: the first electrode 146 defining a first sense electrode spanning the first area (e.g., 50 millimeters squared) on the bottom layer 140 of the substrate 102; and the second electrode 148 defining a second sense electrode spanning the second area (e.g., 90 millimeters squared) on the bottom layer 140 of the substrate 102. In this implementation, the system 100 can include: the first coupling region 147 defining a first drive electrode capacitively coupling the first sense electrode to form the first force sensor proximal the center of the substrate 102; and the second coupling region 149 defining a second drive electrode capacitively coupling the second sense electrode to form the second force sensor proximal the edge of the substrate 102. Therefore, the system 100 can include: as described above, a first force sensor and a second force sensor each arranged in a self-capacitance configuration; and configured to output uniform changes in capacitance values responsive to application of a target force magnitude (e.g., 1000 grams) over the substrate 102.

8.1.3 Variable Area+Interdigitated Electrodes

In one implementation, the system 100 can include: a first electrode 146 defining a first interdigitated drive and sense electrode pair spanning the first area (e.g., 50 millimeters squared) on the bottom layer 140 of the substrate 102; and a second electrode 148 defining a second interdigitated drive and sense electrode pair spanning the second area (e.g., 90 millimeters) on the bottom layer 140 of the substrate 102. In this implementation, the baseplate 166 and the coupling layer 154 form a unitary metallic structure defining: the first coupling region 147 capacitively coupling the first interdigitated drive and sense electrode pair to form a first force sensor proximal the center of the substrate 102; and the second coupling region 149 capacitively coupling the second interdigitated drive and sense electrode pair to form the second force sensor proximal the edge of the substrate 102. In this example, the system 100 can include: the first coupling region 147 spanning a third area, approximating the first area, aligned to the first area of the first electrode 146; and the second coupling region 149 spanning a fourth area, approximating the second area, aligned to the second area of the second electrode 148. Therefore, the system 100 can include: as described above, the first force sensor and the second force sensor in a mutual capacitance configuration; and configured to output uniform changes in capacitance values responsive to application of a target force magnitude (e.g., 1000 grams) over the substrate 102.

8.1.4 Example: Electrode Geometry

In one example, the first electrode 146: spans a first rectangular area (e.g., 50 square millimeters) on the bottom layer 140 of the substrate 102; and is arranged on a center region of the substrate 102 (e.g., a high-deflection region). Additionally, the second electrode 148: spans a second rectangular area (e.g., 90 square millimeters) on the bottom layer 140 of the substrate 102; and is arranged on a side region, adjacent the center region, proximal a lateral edge of the substrate 102 (e.g., a low-deflection region).

Furthermore, the system 100 can include the first coupling region 147: spanning a third rectangular area (e.g., 110 square millimeters) greater than the second rectangular area on the coupling layer 154; aligned to the first electrode 146 on the center region of the substrate 102; and capacitively coupling the first electrode 146 to define a first force sensor characterized by a first baseline capacitance value. Additionally, the system 100 includes the second coupling region 149: spanning the third rectangular area (e.g., 110 square millimeters) on the coupling layer 154; aligned to the second electrode 148 proximal the edge of the substrate 102; and capacitively coupling the second electrode 148 to define a second force sensor characterized by a second baseline capacitance value greater than the first baseline capacitance value. Therefore, the first electrode 146 and the second electrode 148 maintain capacitive coupling to the coupling layer 154 during horizontal displacement of the substrate 102 over the baseplate 166.

8.1.5 Substrate Deflection+Uniform Capacitance

In one implementation, the substrate 102 defines: a center region (i.e., a region of the substrate 102 experiencing high-deflection toward the coupling layer 154 responsive to forces applied to the cover layer 170); and a side region adjacent to the center region and proximal a lateral edge of the substrate 102 (i.e., a region of the substrate 102 experiencing low-deflection toward the coupling layer 154 responsive to forces applied to the cover layer 170). Additionally, the substrate 102 can include: a first support location arranged on the bottom layer 140 of the substrate 102 at the center region; and a second support location arranged on the bottom layer 140 of the substrate 102 at the side region. The first electrode 146: spans the first area (e.g., 50 square millimeters) on the bottom layer 140 of the substrate 102; and is arranged proximal the first support location. Additionally, the second electrode 148: spans the second area (e.g., 90 square millimeters) on the bottom layer 140 of the substrate 102; and is arranged proximal the second support location.

In this implementation, the system 100 includes: a first spacer element coupled to the first support location on the center region; and a second spacer element coupled to the second support location on the side region. Accordingly, responsive to a target force magnitude (e.g., 1000 grams) applied to the cover layer 170, the first spacer element is configured to: yield to a first displacement (e.g., 250 micro meters) of the bottom layer 140 of the substrate 102 toward to the coupling layer 154; and induce a first change in capacitance value between the first electrode 146 and the first coupling region 147. Similarly, responsive to the target force magnitude (e.g., 1000 grams) applied to the cover layer 170, the second spacer element is configured to: yield to a second displacement (e.g., 400 micro meters), greater than the first displacement, of the bottom layer 140 of the substrate 102 toward the coupling layer 154; and induce a second change in capacitance value—approximating (e.g., +/−0.2 picofarads) the first change in capacitance value— between the second electrode 148 and the second coupling region 149. Therefore, responsive to application of the target force magnitude resulting in un-even deflection of the substrate 102 toward the coupling layer 154, the system 100 can: detect uniform change in electrical values (e.g., capacitance values) across the first electrode 146 and the second electrode 148; and interpret force magnitudes applied over the cover layer 170 based on deviations from the uniform change in electrical values per unit force across the first force sensor and the second force sensor.

8.1.6 Capacitance Relationship

In one implementation, the first electrode 146 spans a first area that is derived from a capacitance relationship according to: a known deflection threshold between the first electrode 146 and the first coupling region 147; and a known capacitance threshold (e.g., 2 Pico Farad saturation threshold) for the first electrode 146. In this implementation, the set of spacer elements 160 includes a first spacer element: arranged proximal the first electrode 146; defining a nominal gap (600 micrometers air gap, spacer gap) between the first electrode 146 and the first coupling region 147; and defining a first deflection threshold (e.g., 350 micrometers) between the first electrode 146 and the first coupling region 147 responsive to a target force (e.g., 1000 grams) applied to the cover layer 170. Accordingly, the first electrode 146 spans the first area directly proportional to: a first difference between the nominal gap and the first displacement threshold (e.g., 250 micrometers); and the known capacitance threshold (e.g., 2 picofarads). Similarly, the system 100 includes a second spacer element: arranged proximal the second electrode 148; defining the nominal gap (e.g., 600 micrometer air gap, spacer gap) between the second electrode 148 and the second coupling region 149; and defining a second deflection threshold (e.g., 200 micrometers) between the second electrode 148 and the second coupling region 149 responsive to the target force (e.g., 1000 grams) applied to the cover layer 170. Thus, the second electrode 148 spans the second area, greater than the first area, and directly proportional to: a second difference between the nominal gap and the second displacement threshold (e.g., 400 micrometers); and the known capacitance threshold (e.g., 2 picofarads). Therefore, electrode areas in the first electrode 146 and the second electrode 148 can be configured in order to output uniform change in electrical values (e.g., capacitance values) responsive to application of the target force magnitude resulting in un-even deflection of the substrate 102 toward the coupling layer 154.

8.2 Variable Height Configuration

In one implementation, as shown in FIG. 2, the system 100 can include: the first electrode 146 (e.g., sense electrode) arranged over the first coupling region 147 (e.g., drive electrode) at a first nominal offset distance; and the second electrode 148 (e.g., sense electrode) arranged over the second coupling region 149 (e.g., drive electrode) at a second nominal offset distance less than the first nominal offset distance. In this implementation, the baseplate 166 can include a set of shims: arranged at lateral edges of the baseplate 166; including the second coupling region 149 (e.g., drive electrode) arranged over the set of shims; and configured to define the second nominal offset distance between the second electrode 148 (e.g., sense electrode) and the second coupling region 149 (e.g., drive electrode). Thus, the system 100 can output uniform change in capacitance values without modifying electrode areas for the first set of capacitance force sensors and the second set of capacitance force sensors.

In one example, the system 100 defines: a maximum capacitance value (e.g., two picofarads) for the first set of capacitance force sensors and the second set of capacitance force sensors; and a nominal offset distance (e.g., 600 micrometers) between the set of electrodes (e.g., sense electrodes) and the set of coupling regions (e.g., drive electrodes). Additionally, upon application of a maximum force input (e.g., 1000 grams) on the touch sensor surface 172: the first set of capacitance force sensors defines a first electrode gap (e.g., 250 micrometers); and the second set of capacitance force sensors defines a second electrode gap greater than the first electrode gap (e.g., 400 micrometers). Furthermore, the system 100 includes the first set of capacitance force sensors and the second set of capacitance force sensors defining an electrode area each spanning a target area (e.g., 56.5 millimeters squared). Thus, the system 100 can include a set of shims: defining a target thickness (e.g., 191 micrometers) according to the difference between the second electrode gap (e.g., 400 micrometers) and the minimum offset distance (e.g., 250 micrometers); and arranged at the lateral edges of the baseplate 166 in order to achieve output of uniform change in capacitance values across the capacitance force sensors during deflection of the substrate 102 toward the baseplate 166. Therefore, the system 100 can: receive application of a force input on the touch sensor surface 172, thereby non-uniformly deflecting the substrate 102 toward the baseplate 166; and output a uniform change in capacitance values—less than the maximum capacitance value—without modifying electrode areas for the first set of capacitance force sensors and the second set of capacitance force sensors; and interpret a force magnitude for the force input based on the uniform change in capacitance values detected across the first set of capacitance force sensors and the second set of capacitance force sensors.

8.2.1 Variable Height+Baseplate

In one implementation, as shown in FIGS. 4 and 5, the baseplate 166 is formed of a unitary metallic structure (e.g., sheet metal): defining a first planar region; and arranged below the substrate 102 to define a first nominal gap (e.g., 600 micrometers) between the first electrode 146 on the bottom layer 140 of the substrate 102 and the first coupling region 147 on the coupling layer 154 over the first planar region of the baseplate 166. In this implementation, the unitary metallic structure can include a shim member 169: defining a second planar region; and arranged over the unitary metallic structure to define the second nominal gap (e.g., 400 micrometers) between the second electrode 148 on the bottom layer 140 of the substrate 102 and the second coupling region 149 on the coupling layer 154 over of the second planar region of the baseplate 166.

In another implementation, the baseplate 166 is fabricated (e.g., stamped) to form: a first planar region below the substrate 102 at a first nominal gap (e.g., 600 micrometers) between the first electrode 146 on the bottom layer 140 of the substrate 102 and the first coupling region 147 on the coupling layer 154 over the first planar region; and a second planar region, offset above the first planar region, below the substrate 102 at a second nominal gap (e.g., 400 micrometers) between the second electrode 148 on the bottom layer 140 of the substrate 102 and the second coupling region 149 on the coupling layer 154 over the second planar region.

Therefore, the first nominal gap and the second nominal gap between the bottom layer 140 of the substrate 102 and the coupling layer 154 cooperate to output uniform change in electrical values (e.g., capacitance values) at the first electrode 146 and the second electrode 148 responsive to application of a target force magnitude over the substrate 102 (e.g., proximal the center of the substrate 102, proximal the edge of the substrate 102).

8.2.2 Uniform Capacitive Coupling+Baseline Capacitance

In one implementation, the system 100 can include: a first electrode 146 arranged at a first nominal gap (e.g., 600 micrometers) from the first coupling region 147 on the coupling layer 154 to form a first force sensor; and a second electrode 148 arranged at a second nominal gap (e.g., 400 micrometers), less than the first nominal gap, from the second coupling region 149 on the coupling layer 154 to form a second force sensor. In this implementation, the varying capacitance characteristics of the first force sensor and the second force sensor cooperate to output uniform changes in electrical values (e.g., capacitance values) responsive to application of a target force magnitude (e.g., 1000 grams) applied over the cover layer 170. Accordingly, the system 100 can then interpret force magnitudes for a touch input applied over the cover layer 170 based on deviations per unit force from the uniform change in electrical values across the first force sensor and the second force sensor.

For example, during a first scan cycle, the system 100 can: detect a first touch input at a first location proximal the center of the substrate 102; read a first electrical value (e.g., capacitance value) from the first electrode 146 representing capacitive coupling between the first electrode 146 and the first coupling region 147 as a function of applied forces to the center of the substrate 102; and interpret a first force magnitude (e.g., 1000 grams) for the first touch input based on the first electrical value, such as based on a deviation from a first baseline capacitance value for the first force sensor. Additionally, during a second scan cycle, the system 100 can: detect a second touch input at a second location proximal the edge of the substrate 102; read a second electrical value (e.g., capacitance value)—approximating the first electrical values (e.g., +/−0.02 picofarads)—from the second electrode 148 representing capacitive coupling between the second electrode 148 and the second coupling region 149 as a function of applied forces proximal the edge of the substrate 102; and interpret a second force magnitude (e.g., 1000 grams)—approximating (e.g., +/31 10 grams) the first force magnitude—based on the second electrical value, such as based on a deviation from a second baseline capacitance value for the second force sensor.

In this example, the system 100 can further include: a set of drive and sense electrode pairs 105 arranged on the top layer 104 of the substrate 102; and a cover layer 170 arranged over the set of drive and sense electrode pairs 105 to define a touch sensor surface 172. Thus, the system 100 can: during the first scan cycle, detect the first touch input at the first location based on electrical values read from the set of drive and sense electrode pairs 105 on the substrate 102; and, during the second scan cycle, detect the second touch input at the second location based on electrical values read from the set of drive and sense electrode pairs 105 on the substrate 102.

In another example, the system 100 includes the first electrode 146 and the second electrode 148 spanning a target area (e.g., 55 millimeters squared) on the bottom layer 140 of the substrate 102. Accordingly, the first electrode 146 capacitively couples the first coupling region 147 to form a first force sensor proximal the center of the substrate 102. Accordingly, the first force sensor is then characterized by a first baseline capacitance value: directly proportional to the target area (e.g., 55 millimeters squared) of the first electrode 146; and inversely proportional to the first nominal gap (e.g., 600 micrometers). Additionally, the second electrode 148 capacitively couples the second coupling region 149 to form a second force sensor proximal the edge of the substrate 102. Accordingly, the second force sensor is then characterized by a second baseline capacitance value: directly proportional to the target area (e.g., 55 millimeters squared) of the second electrode 148; inversely proportional to the second nominal gap (e.g., 400 micrometers); and greater than the first baseline capacitance value.

Thus, during a scan cycle, the system 100 can: detect a first touch input at a first location on the cover layer 170; read a first capacitance value from the first force sensor; and read a second capacitance value from the second force sensor. The system 100 can then: detect a first capacitance value approximating (e.g., +/−0.02 picofarads) the second capacitance value; and interpret the first force magnitude (e.g., 1000 grams) for the first touch input based on the first capacitance value and the second capacitance value.

Therefore, the system 100 can, rather than yield non-uniform electrical values (e.g., capacitance values) across the first force sensor and the second force sensor responsive to application of a target force magnitude (e.g., 1000 grams) over the substrate 102, the system 100 can: responsive to application of the target force magnitude, yield a uniform change in electrical values across the first force sensor and the second force sensor; and interpret force magnitudes over the substrate 102 based on deviations—per unit force—from the uniform change in electrical values across the first force sensor and the second force sensor.

8.2.3 Variable Height+Thru-Mode Configuration

In one implementation, the system 100 can include: the first electrode 146 defining a first sense electrode arranged at the first nominal gap (e.g., 600 micrometers) from the first coupling region 147 on the coupling layer 154; and the second electrode 148 defining a second sense electrode arranged at the second nominal gap (e.g., 400 micrometers) from the second coupling region 149 on the coupling layer 154. In this implementation, the system 100 can include: the first coupling region 147 defining a first drive electrode capacitively coupling the first sense electrode to form the first force sensor proximal the center of the substrate 102; and the second coupling region 149 defining a second drive electrode capacitively coupling the second sense electrode to form the second force sensor proximal the edge of the substrate 102. Therefore, the system 100 can include: as described above, a first force sensor and a second force sensor in a self-capacitance configuration; and configured to output uniform changes in capacitance values responsive to application of a target force magnitude (e.g., 1000 grams) over the cover layer 170.

8.2.4 Variable Height+Interdigitated Electrodes

In one implementation, the system 100 can include: a first electrode 146 defining a first interdigitated drive and sense electrode pair arranged at the first nominal gap (e.g., 600 micrometers) from the first coupling region 147 on the coupling layer 154; and a second electrode 148 defining a second interdigitated drive and sense electrode pair arranged at the second nominal gap (e.g., 400 micrometers) from the second coupling region 149 on the coupling layer 154. In this implementation, the baseplate 166 and the coupling layer 154 form a unitary metallic structure defining: a first coupling region 147 capacitively coupling the first interdigitated drive and sense electrode pairs to form the first force sensor proximal the center of the substrate 102; and a second coupling region 149 capacitively coupling the second interdigitated drive and sense electrode pairs to form the second force sensor proximal the edge of the substrate 102. Therefore, the system 100 can include: as described above, a first force sensor and a second force sensor in a mutual capacitance configuration; and configured to output uniform changes in capacitance values responsive to application of a target force magnitude (e.g., 1000 grams) over the cover layer 170.

8.1.5 Example: Electrode Geometry

In one example, the first electrode 146: spans a first rectangular area (e.g., 55 square millimeters) on the bottom layer 140 of the substrate 102; and is arranged on a center region of the substrate 102 (e.g., a high-deflection region). Additionally, the second electrode 148: spans the first rectangular area (e.g., 55 square millimeters) on the bottom layer 140 of the substrate 102; and is arranged on a side region, adjacent the center region, proximal a lateral edge of the substrate 102 (e.g., a low-deflection region).

Furthermore, the system 100 can include a first coupling region 147: spanning a second rectangular area (e.g., 70 square millimeters) greater than the first rectangular area on the coupling layer 154; aligned to the first electrode 146 on the center region of the substrate 102 at the first nominal gap (e.g., 600 micrometers); and capacitively coupling the first electrode 146 to define a first force sensor characterized by a first baseline capacitance value. Additionally, the second coupling region 149: spans the second rectangular area (e.g., 70 square millimeters) on the coupling layer 154; is aligned to an electrode in the second electrode 148 on the side region of the substrate 102 at the second nominal gap (e.g., 400 micrometers); and capacitively couples the electrode to define a second force sensor characterized by a second baseline capacitance value greater than the first baseline capacitance value.

Therefore, the system 100 can: responsive to application of a target force magnitude (e.g., 1000 grams) yield uniform changes in electrical values (e.g., capacitance values) across the first force sensor and the second force sensor; and interpret force magnitudes applied to the cover layer 170 based on the uniform change in electrical values across the first force sensor and the second force sensor.

8.2.6 Substrate Deflection+Uniform Capacitance

In one implementation, the substrate 102 defines: a center region (i.e., a high-deflection region of the substrate 102 toward the coupling layer 154 responsive to forces applied to the cover layer 170); and a side region adjacent to the center region and proximal a lateral edge of the substrate 102 (i.e., a low-deflection region of the substrate 102 toward the coupling layer 154 responsive to forces applied to the cover layer 170). Additionally, the substrate 102 can include: a first support location arranged on the bottom layer 140 of the substrate 102 at the center region; and a second support location arranged on the bottom layer 140 of the substrate 102 at the side region. The first electrode 146: spans a first area (e.g., 55 square millimeters) on the bottom layer 140 of the substrate 102; and is arranged proximal a first support location. Furthermore, the second electrode 148: spans the first area (e.g., 55 square millimeters) on the bottom layer 140 of the substrate 102; and is arranged proximal a second support location.

In this implementation, the system 100 includes: a first spacer element coupled to the first support location on the center region to vertically align the first electrode 146 to the first coupling region 147 at the first nominal gap (e.g., 600 micrometers); and a second spacer element coupled to the second support location on the side region to vertically align the second electrode 148 to the second coupling region 149 at the second nominal gap (e.g., 400 micrometers). Accordingly, responsive to a target force magnitude (e.g., 1000 grams) applied to the cover layer 170, the first spacer element is configured to: yield to a first displacement (e.g., 250 micro meters) of the bottom layer 140 of the substrate 102 toward to the coupling layer 154; and induce a first capacitance value between the first electrode 146 and the first coupling region 147. Similarly, responsive to application of the target force magnitude (e.g., 1000 grams) applied to the cover layer 170, the second spacer element is configured to: yield to a second displacement (e.g., 240 micro meters)—approximating the first displacement (e.g., +/−30 micrometers)—of the bottom layer 140 of the substrate 102 toward the coupling layer 154; and induce a second capacitance value—approximating (e.g., +/−0.2 picofarads) the first capacitance value—between the second electrode 148 and the second coupling region 149. Therefore, in response to application of a target force magnitude (e.g., 1000 grams) resulting in un-even deflection of the substrate 102 toward to the coupling layer 154, the system 100 can: detect a uniform change in electrical values (e.g., capacitance values) across the first electrode 146 and the second electrode 148; and interpret force magnitudes applied over the cover layer 170 based on the uniform change in electrical values across the first force sensor and the second force sensor.

8.1.7 Capacitance Relationship

In one implementation, the second electrode 148 is arranged at the second nominal gap—from the second coupling region 149—which is derived from a capacitance relationship according to: a known nominal gap (e.g., 600 micrometers) between the first electrode 146 and the first coupling region 147 on the coupling layer 154; a known deflection threshold (e.g., 200 micrometers) between the second electrode 148 and the second coupling region 149 on the coupling layer 154; a known area (e.g., 55 millimeters squared) of the first electrode 146 and the second electrode 148; and a known capacitance threshold (e.g., 2 Pico Farad saturation threshold) for the first electrode 146 and the second electrode 148. Accordingly, the second nominal gap (e.g., 400 micrometers +/−50 micrometers) can be derived as a summation of: the known deflection threshold (e.g., 200 micrometers) between the second electrode 148 and the second coupling region 149; and a saturation displacement threshold (250 micrometers) derived from a capacitance relationship between the known electrode area (e.g., 55 millimeters squared) and the known capacitance threshold (e.g., 2 picofarads).

As described above, the baseplate 166 can be formed (e.g., stamped) and/or include shim members 169 to locate: the first electrode 146 at the first nominal gap from the first coupling region 147 on the coupling layer 154; and the second electrode 148 at the second nominal gap from the second coupling region 149 on the coupling layer 154. Therefore, electrode gaps in the first force sensor and the second force sensor can be configured to output a uniform change in electrical values (e.g., capacitance values) during application of a target force magnitude (e.g., 1000 grams) resulting in un-even deflection of the substrate 102 toward the coupling layer 154.

8.1.8 Elasticity

In this implementation, the system 100 includes a first spacer element: coupled to the first support location on the center region to vertically align the first electrode 146 to the first coupling region 147 at the first nominal gap (e.g., 600 micrometers); and defining a first elasticity (e.g., first durometer). Additionally, the system 100 can include a second spacer element: coupled to the second support location on the side region to vertically align the second electrode 148 to the second coupling region 149 at the second nominal gap (e.g., 400 micrometers); and defining a second elasticity (e.g., second durometer) less than the first elasticity. Accordingly, responsive to a target force magnitude (e.g., 1000 grams) applied proximal the center of the substrate 102, the first spacer element is configured to yield to: locate the first electrode 146 at the first compression height (e.g., 200 micrometers) from the first coupling region 147; and induce a first capacitance value at the first electrode 146. Similarly, responsive to application of the target force magnitude (e.g., 1000 grams) applied proximal the edge of the substrate 102, the second spacer element is configured to yield to: locate the second electrode 148 at a second compression height (e.g., 209 micrometers), approximating (e.g., +/−10 micrometers) the first compression height, from the second coupling region 149; and induce a second capacitance value, approximating the first capacitance value, at the second electrode 148.

Therefore, rather than structurally modifying the baseplate 166 and/or the substrate 102 to yield a uniform change in capacitance across the first force sensor and the second force sensor, the system 100 can include spacer elements of varying elasticity to yield the uniform change in capacitance across the first force sensor and the second force sensor responsive to application of the target force magnitude (e.g., 1000 grams) over the substrate 102.

8.3 Variable Electrode Area+Variable Height Configuration

In another implementation the system 100 can include: the first electrode 146 (e.g., sense electrodes) arranged at a first nominal offset distance from the first coupling region 147 (e.g., drive electrode); and the first set of capacitance force sensors defining a first electrode area. Additionally, the system 100 includes: the second electrode 148 (e.g., sense electrode) arranged at a second nominal offset distance—different from the first nominal offset distance—from the second coupling region 149 (e.g., drive electrode); and the second set of capacitance force sensors defining a second electrode area different from the first electrode area. As described above, the system 100 can implement modifications to the nominal offset distances and the electrode areas in order to output uniform changes in capacitance values across the first set of capacitance force sensors and the second set of capacitance force sensors during non-uniform deflection of the substrate 102 toward the baseplate 166. Thus, the system 100 can: detect these uniform changes in capacitance values from the set of electrodes (e.g., sense electrodes) across the bottom layer 140 of the substrate 102; and interpret a force magnitude applied on the touch sensor surface 172 based on the uniform changes in capacitance values.

8.4 Force Sensor Variations

Variations of the system 100 can implement multiple force sensing technologies, such as resistive force sensors, mutual capacitance force sensors (e.g., drive and sense electrode pairs patterned across the bottom side of the substrate 102), and/or self-capacitance force sensors. In these variations, as described above, the capacitance force sensors can be modified (e.g., height, surface area) in order to achieve a target force reading based on inputs applied over the touch sensor surface 172. In one example, the system 100 can include: a set of sense elements discretely arranged across the bottom end of the substrate 102; and a unitary drive element arranged across the baseplate 166 and opposite the set of elements on the substrate 102.

8.5 Gain Tuning

In another implementation, rather than structurally modifying offset distance and/or electrode area across the set of electrodes, the system 100 can: serially drive each drive electrode in the set of coupling regions by varying voltages, over varying time intervals, or with varying alternating voltages of a particular frequency; read a set of capacitance values—from each sense electrode in the set of electrodes on the bottom layer 140 of the substrate 102—that represent uniform changes in capacitance between the set of electrodes (e.g., sense electrodes) and the set of coupling regions (e.g., drive electrodes) of the set of force sensors; and interpret a distribution of forces applied to the cover layer 170 based on the uniform changes in capacitance.

In one implementation, the substrate 102 defines: a center region (i.e., a high-deflection region of the substrate 102 toward the coupling layer 154 responsive to forces applied to the cover layer 170); and a side region adjacent the center region and proximal a lateral edge of the substrate 102 (i.e., a low-deflection region of the substrate 102 toward the coupling layer 154 responsive to forces applied to the cover layer 170). The substrate 102 includes: a first electrode 146 arranged on the bottom layer 140 at the center region and capacitively coupling a first coupling region 147 on the coupling layer 154 to form a first force sensor; and a second electrode 148 arranged on the bottom layer 140 at the side region and capacitively coupling a second coupling region 149, on the coupling layer 154 to form a second force sensors. In this implementation, responsive to forces applied to the cover layer 170, the second force sensors at the side region experience a capacitance change that is less than a capacitance change at the first force sensor at the center region. Accordingly, the system 100 can thus drive the first coupling region 147 (e.g., drive electrodes) and the second coupling region 149 (e.g., drive electrodes) at varying voltages in order to maintain uniform change in capacitance values across the first force sensor and the second force sensors during un-even deflection of the substrate 102 toward the coupling layer 154. For example, the system 100 can: detect a first touch input at a first location on the cover layer 170; drive the first coupling region 147 (e.g., drive electrodes) to a first target voltage (e.g., 5 volts); drive the second coupling region 149 (e.g., drive electrodes) to a second target voltage (e.g., 7 volts) greater than the first target voltage; read a first set of electrical values (e.g., capacitance values) from the first force sensor; and read a second set of electrical values (e.g., capacitance values) from the second force sensors. The system 100 can then: detect a first capacitance represented in the first set of electrical values; detect a second capacitance—approximating (e.g., +/−0.02 picofarads) the first capacitance—represented in the second set of electrical values; and interpret the first force magnitude for the first touch input based on the first capacitance and the second capacitance.

Therefore, rather than structurally modifying the first force sensor and the second force sensors, the system 100 can: serially drive the first force sensor and the second force sensors at varying voltages or current to maintain uniform change in capacitance values responsive to application of a target force magnitude (e.g., 1000 grams) resulting un-even deflection of the substrate 102 toward the coupling layer 154; and interpret force magnitudes applied to the cover layer 170 based on the uniform change in capacitance values across the first force sensor and the second force sensor.

9. Haptics Integration

In one variation, the system 100 can include a multi-layer inductor 150 integrated into the substrate 102 that cooperates with a set of magnetic elements 181—housed within the chassis 192 below the multi-layer inductor 150—to define a compact, integrated multi-layer inductor 150 configured to oscillate the substrate 102 and the touch sensor surface 172 responsive to polarization of the multi-layer inductor 150 by the controller 190 (e.g., in response detecting touch inputs on the touch sensor surface 172). More specifically, the controller 190, in conjunction with a drive circuit, can supply an alternating (i.e., time-varying) drive current to the multi-layer inductor 150 during a haptic feedback cycle, thereby generating a time-varying magnetic field through the multi-layer inductor 150 that periodically reverses direction. Thus, the controller 190 and/or the drive circuit can transiently polarize the multi-layer inductor 150 to generate magnetic forces between the multi-layer inductor 150 and the set of magnetic elements 181, thereby causing the multi-layer inductor 150 (and thus the substrate 102 and touch sensor surface 172) to be alternately attracted and repelled by poles of the set of magnetic elements 181 and oscillating the touch sensor surface 172 relative to the chassis 192. In particular, in response to detecting a touch input—on the touch sensor surface 172—that exceeds a threshold force (or pressure) magnitude, the controller 190 drives the multi-layer inductor 150 during a "haptic feedback cycle" in order to tactilely mimic actuation of a mechanical snap button. For example, in response to such a touch input, the controller 190 can trigger a motor driver to drive the multi-layer inductor 150 with a square-wave alternating voltage for a target click duration (e.g., 250 milliseconds), thereby inducing an alternating magnetic field through the multi-layer inductor 150, which magnetically couples to the set of magnetic elements 181, induces an oscillating force between the magnetic element and the multi-layer inductor 150, and oscillates the substrate 102 relative to the chassis 192 of the device.

The system 100 and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other system 100 s and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system for detecting force inputs comprising:
a substrate comprising a first edge;
a first electrode arranged on the substrate proximal a center of the substrate;
a second electrode arranged on the substrate and interposed between the first electrode and the first edge of the substrate;
a baseplate arranged below the substrate and comprising:
a first planar region below the first electrode on the substrate; and
a second planar region, offset above the first planar region, below the second electrode on the substrate;
a set of spacer elements:
interposed between the substrate and the baseplate; and
configured to support the substrate over the baseplate;
a first coupling region:
arranged on the first planar region of the baseplate;
aligned to the first electrode;
offset from the first electrode by a first nominal gap height; and
electrically coupling to the first electrode to yield a first change in electrical values at the first electrode responsive to application of a first force magnitude proximal the center of the substrate; and
a second coupling region:
arranged on the second planar region of the baseplate;
aligned to the second electrode;
offset from the second electrode by a second nominal gap height, less than the first nominal gap height; and
electrically coupling to the second electrode to yield a second change in electrical values, approximating the first change in electrical values, at the second electrode responsive to application of a second force magnitude, approximating the first force magnitude, proximal the first edge of the substrate.

2. The system of claim 1, further comprising:
a cover layer arranged over the substrate; and
a controller configured to:
during a first scan cycle:
detect a first touch input at a first location on the cover layer proximal the center of the substrate;
detect the first change in electrical values from the first electrode, the first change in electrical values representing capacitive coupling between the first electrode and the first coupling region; and
interpret the first force magnitude for the first touch input based on the first change in electrical values; and
during a second scan cycle:
detect a second touch input at a second location on the cover layer proximal the first edge of the substrate;
detect the second change in electrical values, approximating the first change in electrical values, from the second electrode, the second change in electrical values representing capacitive coupling between the second electrode and the second coupling region; and
interpret the second force magnitude for the first touch input based on the second change in electrical values.

3. The system of claim 2:
further comprising a set of drive and sense electrode pairs arranged on a top layer of the substrate;
wherein the cover layer is arranged over the set of drive and sense electrode pairs; and
wherein the controller is configured to:
during the first scan cycle:
read a first set of electrical values from the set of drive and sense electrode pairs; and
detect the first touch input at the first location based on the first set of electrical values; and
during the second scan cycle:
read a second set of electrical values from the set of drive and sense electrode pairs; and
detect the second touch input at the second location based on the second set of electrical values.

4. The system of claim 1:
wherein the first electrode spans a first area of the substrate and arranged proximal the center of the substrate;
wherein the first electrode capacitively couples to the first coupling region to form a first force sensor characterized by a first baseline capacitance value:
directly proportional to the first area of the first electrode; and
inversely proportional to the first nominal gap height;
wherein the second electrode spans a second area, approximating the first area, of the substrate and interposed between the first electrode and the first edge of the substrate; and
wherein the second electrode capacitively couples to the second coupling region to form a second force sensor characterized by a second baseline capacitive value:
greater than the first baseline capacitance value;
directly proportional to the second area of the second electrode; and
inversely proportional to the second nominal gap height.

5. The system of claim 4, further comprising a controller configured to:
during a first scan cycle:
detect a first touch input at a first location on the cover layer proximal the center of the substrate;
read a first capacitance value from the first force sensor;
detect a first change in capacitance based on the first capacitance value and the first baseline capacitance value; and
interpret the first force magnitude of the first touch input based on the first change in capacitance; and
during a second scan cycle:
detect a second touch input at a second location on the cover layer proximal the first edge of the substrate;
read a second capacitance value from the second force sensor;
detect a second change in capacitance based on the second capacitance value and the second baseline capacitance value, the second change in capacitance approximating the first change in capacitance; and
interpret the second force magnitude of the second touch input based on the second change in capacitance.

6. The system of claim 1, wherein the baseplate comprises a unitary metallic structure stamped to offset the second planar region above the first planar region of the baseplate.

7. The system of claim 1, wherein the baseplate comprises:
a unitary metallic structure:
defining the first planar region; and
arranged below the substrate to offset the first coupling region from the first electrode by the first nominal gap height; and
a shim member arranged on the unitary metallic structure to:
define the second planar region offset above the first planar region; and
offset the second coupling region from the second electrode by the second nominal gap height.

8. The system of claim 1:
wherein the baseplate comprises a unitary metallic structure:
comprising:
a center section comprising:
the first planar region; and
the second planar region offset above the first planar region;
a first side section adjacent the center section and defining a nominal plane; and
a second side section, opposite the first side section, adjacent the center section and defining the nominal plane; and
stamped to inset the center section below the nominal plane of the first side section and the second side section; and
wherein the substrate is arranged within the center section of the baseplate and aligned to the nominal plane of the first side section and the second side section.

9. The system of claim 8, further comprising:
a set of drive and sense electrode pairs arranged across a top layer of the substrate; and
a cover layer:
arranged over the set of drive and sense electrode pairs on the top layer of the substrate;
extending across the baseplate supported by the first side section, the substrate within the center section of the baseplate, and the second side section; and
defining a touch sensor surface within the center section of the baseplate.

10. The system of claim 8, wherein the unitary metallic structure comprises:
a first relief arranged between the first side section and the center section; and
a second relief arranged between the second side section and the center section.

11. The system of claim 1:
wherein the substrate further comprises:
a first support location arranged on a bottom layer of the substrate proximal the first electrode; and
a second support location arranged on the bottom layer of the substrate proximal the second electrode;
wherein the baseplate comprises a unitary structure defining a nominal plane;
further comprising a first spring element:
arranged on the baseplate adjacent the first support location;
defining a first stage; and
configured to return to approximately the nominal plane in response to absence of the first force magnitude applied over the substrate;
further comprising a second spring element:
arranged on the baseplate adjacent the second support location;
defining a second stage; and
configured to return to approximately the nominal plane in response to absence of the second force magnitude applied over the substrate; and
wherein the set of spacer elements comprises:
a first spacer element coupling the first support location and the first stage to locate the first electrode over the first coupling region; and
a second spacer element coupling the second support location and the second stage to locate the second electrode over the second coupling region.

12. The system of claim 1:
wherein the substrate further comprises:
a first support location arranged on a bottom layer of the substrate proximal the first electrode; and
a second support location arranged on the bottom layer of the substrate proximal the second electrode;
wherein the set of spacer elements comprises:
a first spacer element:
coupling the substrate and the first planar region of the baseplate at the first support location; and configured to, responsive to application of the first force magnitude, yield to:
offset the first electrode on the substrate by a first gap height, less than the first nominal gap height, from the first coupling region on the baseplate; and
induce the first change in electrical values at the first electrode corresponding to the first gap height; and
a second spacer element:
coupling the substrate and the second planar region of the baseplate at the second support location; and
configured to, responsive to application of the second force magnitude approximating the first force magnitude, yield to:
offset the second electrode on the substrate at a second gap height, less than the second nominal gap height and approximating the first gap height, from the second coupling region on the baseplate; and
induce the second change in electrical values, approximating the first change in electrical values, corresponding to the second gap height.

13. The system of claim 1:
wherein the substrate further comprises a second edge, opposite the second edge;
further comprising a third electrode arranged on the substrate and interposed between the first electrode and the second edge of the substrate;
wherein the baseplate further comprises a third planar region:
offset above the first planar region;
aligned to the second planar region; and
arranged below the third electrode on the substrate; and
further comprising a third coupling region:
arranged on the third planar region of the baseplate;
aligned to the third electrode;
offset from the third electrode by a third nominal gap height, approximating the second nominal gap height; and
electrically coupling to the third electrode to yield a third change in electrical values, approximating the first change in electrical values and the second change in electrical values, at the third electrode responsive to application of a third force magnitude, approximating the first force magnitude and the second force magnitude, proximal the second edge of the substrate.

14. The system of claim 1:
wherein the first electrode defines a first sense electrode spanning a first area on the substrate and arranged proximal the center of the substrate;
wherein the second electrode defines a second sense electrode spanning a second area, approximating the first area, and arranged proximal the edge of the substrate;
wherein the first coupling region defines a first drive electrode capacitively coupling to the first sense electrode to form a first force sensor proximal the center of the substrate; and
wherein the second coupling region defines a second drive electrode capacitively coupling to the second sense electrode to form a second force sensor proximal the edge of the substrate.

15. The system of claim 1:
wherein the first electrode defines a first interdigitated drive and sense electrode pair spanning a first area on the substrate and arranged proximal the center of the substrate;
wherein the second electrode defines a second interdigitated drive and sense electrode pair spanning a second area, approximating the first area, and arranged proximal the edge of the substrate;
wherein the baseplate comprises a unitary metallic structure defining:
the first coupling region capacitively coupling the first interdigitated drive and sense electrode pair to form a first force sensor proximal the center of the substrate; and
the second coupling region capacitively coupling the second interdigitated drive and sense electrode pair to form a second force sensor proximal the edge of the substrate.

16. A system for detecting force inputs comprising:
a substrate comprising a first edge;
a first electrode arranged on the substrate proximal a center of the substrate;
a second electrode arranged on the substrate and interposed between the first electrode and the first edge of the substrate;
a baseplate arranged below the substrate and comprising:
a first planar region below the first electrode on the substrate; and
a second planar region, offset above the first planar region, below the second electrode on the substrate;
a first coupling region:
arranged on the first planar region of the baseplate;
aligned to the first electrode;
offset from the first electrode by a first nominal gap height; and
electrically coupling to the first electrode to yield a first change in electrical values at the first electrode responsive to application of a first force magnitude proximal the center of the substrate; and
a second coupling region:
arranged on the second planar region of the baseplate;
aligned to the second electrode;
offset from the second electrode by a second nominal gap height, less than the first nominal gap height; and
electrically coupling to the second electrode to yield a second change in electrical values, approximating the first change in electrical values, at the second electrode responsive to application of the first force magnitude proximal the center of the substrate.

17. The system of claim 16, further comprising:
a cover layer arranged over the substrate;
a controller configured to, during a scan cycle:
detect a first touch input at a first location on the cover layer proximal the center of the substrate;
detect the first change in electrical values from the first electrode, the first change in electrical values representing capacitive coupling between the first electrode and the first coupling region; and
detect the second change in electrical values, approximating the first change in electrical values, from the second electrode, the second change in electrical values representing capacitive coupling between the second electrode and the second coupling region; and
interpret the first force magnitude for the first touch input based on the first change in electrical values and the second change in electrical values.

18. The system of claim 16:
wherein the first electrode spans a first area of the substrate and arranged proximal the center of the substrate;

wherein the first electrode capacitively couples to the first coupling region to form a first force sensor characterized by a first baseline capacitance value:
  directly proportional to the first area of the first electrode; and
  inversely proportional to the first nominal gap height;
wherein the second electrode spans a second area, approximating the first area, of the substrate and interposed between the first electrode and the first edge of the substrate; and
wherein the second electrode capacitively couples to the second coupling region to form a second force sensor characterized by a second baseline capacitive value:
  greater than the first baseline capacitance value;
  directly proportional to the second area of the second electrode; and
  inversely proportional to the second nominal gap height.

19. The system of claim 16:
wherein the first electrode defines a first sense electrode spanning a first area on the substrate and arranged proximal the center of the substrate;
wherein the second electrode defines a second sense electrode spanning a second area, approximating the first area, and arranged proximal the edge of the substrate;
wherein the first coupling region defines a first drive electrode capacitively coupling to the first sense electrode to form a first force sensor proximal the center of the substrate; and
wherein the second coupling region defines a second drive electrode capacitively coupling to the second sense electrode to form a second force sensor proximal the edge of the substrate.

20. A system for detecting force inputs comprising:
a substrate comprising:
  a first edge; and
  a second edge opposite the first edge;
a first electrode arranged on the substrate proximal a center of the substrate;
a second electrode arranged on the substrate and interposed between the first electrode and the first edge of the substrate;
a third electrode arranged on the substrate and interposed between the first electrode and the second edge of the substrate;
a baseplate arranged below the substrate and comprising:
  a first planar region below the first electrode on the substrate; and
  a second planar region, offset above the first planar region, below the second electrode on the substrate; and
  a third planar region:
    offset above the first planar region;
    aligned to the second planar region; and
    arranged below the third electrode on the substrate;
a first coupling region:
  arranged on the first planar region of the baseplate;
  offset from the first electrode by a first nominal gap height; and
  electrically coupling to the first electrode to yield a first change in electrical values at the first electrode responsive to application of a first force magnitude proximal the center of the substrate;
a second coupling region:
  arranged on the second planar region of the baseplate;
  offset from the second electrode by a second nominal gap height, less than the first nominal gap height; and
  electrically coupling to the second electrode to yield a second change in electrical values, approximating the first change in electrical values, at the second electrode responsive to application of a first force magnitude proximal the center of the substrate; and
a third coupling region:
  arranged on the third planar region of the baseplate;
  offset from the third electrode by a third nominal gap height, approximating the second nominal gap height; and
  electrically coupling to the third electrode to yield a third change in electrical values, approximating the first change in electrical values and the second change in electrical values, at the third electrode responsive to application of a first force magnitude proximal the center of the substrate.

* * * * *